United States Patent
Hashimoto et al.

(10) Patent No.: US 9,570,966 B2
(45) Date of Patent: Feb. 14, 2017

(54) METHOD FOR MANUFACTURING A COIL

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Shingo Hashimoto, Okazaki (JP); Hiroyuki Tanaka, Anjo (JP); Takanori Ota, Anjo (JP); Kazuya Iwatsuki, Takahama (JP); Manabu Kitamura, Miyoshi (JP); Atsushi Watanabe, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 14/373,204

(22) PCT Filed: Feb. 4, 2013

(86) PCT No.: PCT/JP2013/052435
§ 371 (c)(1),
(2) Date: Jul. 18, 2014

(87) PCT Pub. No.: WO2013/129029
PCT Pub. Date: Sep. 6, 2013

(65) Prior Publication Data
US 2015/0013149 A1 Jan. 15, 2015

(30) Foreign Application Priority Data
Feb. 28, 2012 (JP) .................................. 2012-042124

(51) Int. Cl.
*H02K 15/04* (2006.01)
*H02K 3/12* (2006.01)

(52) U.S. Cl.
CPC .............. *H02K 15/045* (2013.01); *H02K 3/12* (2013.01); *Y10T 29/49071* (2015.01)

(58) Field of Classification Search
CPC .... H02K 15/045; H02K 3/12; Y10T 29/49071
See application file for complete search history.

(56) References Cited

U.S. PATENT DOCUMENTS

| 5,926,940 A | 7/1999 | Toh et al. |
| 8,884,489 B2 | 11/2014 | Yamada et al. |

(Continued)

FOREIGN PATENT DOCUMENTS

| EP | 2 416 471 A1 | 2/2012 |
| JP | A-10-66314 | 3/1998 |

(Continued)

*Primary Examiner* — Livius R Cazan
(74) *Attorney, Agent, or Firm* — Oliff PLC

(57) ABSTRACT

A method for manufacturing a coil that is formed by winding a conductor in a loop shape and stacking loops of the conductor and that includes a slot placement portion to be placed in a slot of a stator core, and a coil end placement portion to be placed outside the slot. The method preferably involves a winding step, a protrusion forming step, a crank forming step, an opening step, and an arc forming step. The winding step forms a winding having slot placement and coil end placement portions. The protrusion forming step forms a protruding shape that protrudes in a radially outward direction of the winding. In the crank forming step a stepped portion. The opening step of forming the winding so that an interval between the pair of expected slot placement portions gradually increases. The arc forming step forms an arc-shaped portion curved in the stacking direction.

6 Claims, 48 Drawing Sheets

(56) References Cited

U.S. PATENT DOCUMENTS

| | | | |
|---|---|---|---|
| 2002/0057031 A1 | 5/2002 | Ueda et al. | |
| 2008/0093948 A1* | 4/2008 | Naganawa | H02K 15/063 |
| | | | 310/203 |
| 2009/0267441 A1 | 10/2009 | Hiramatsu et al. | |
| 2012/0025658 A1* | 2/2012 | Watanabe | H02K 3/12 |
| | | | 310/179 |

FOREIGN PATENT DOCUMENTS

| | | |
|---|---|---|
| JP | 2004-261000 A | 9/2004 |
| JP | A-2006-149113 | 6/2006 |
| JP | A-2008-104293 | 5/2008 |
| JP | A-2009-195006 | 8/2009 |
| JP | A-2011-193597 | 9/2011 |
| JP | A-2012-125043 | 6/2012 |
| WO | 2011/155083 A1 | 12/2011 |

* cited by examiner

FIG. 5
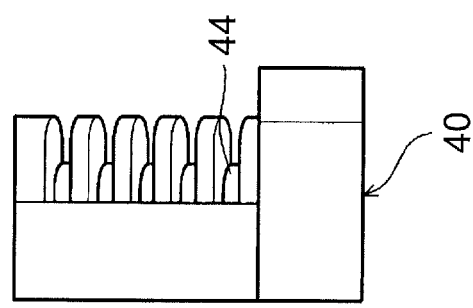
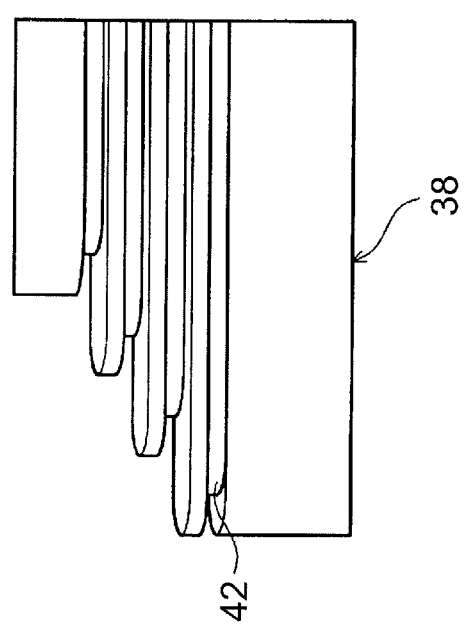

FIG. 6
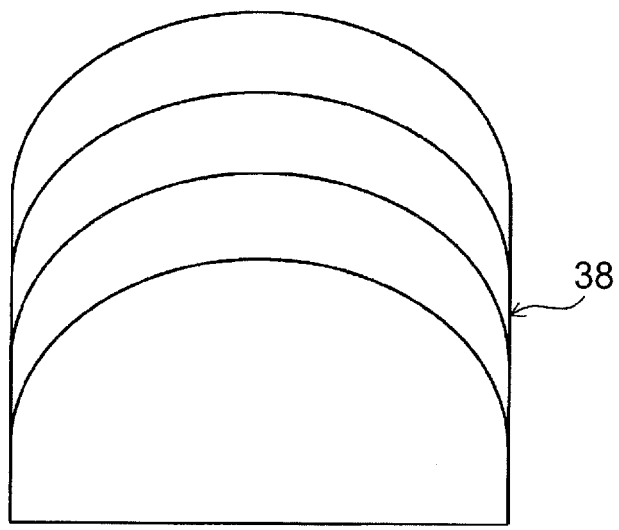
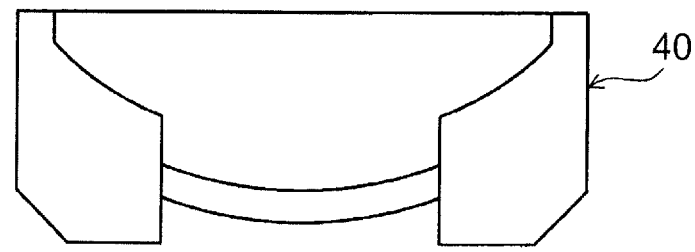

METHOD FOR MANUFACTURING A COIL

TECHNICAL FIELD

The present invention relates to methods for manufacturing a coil for use in rotating electrical machines for automobile etc.

BACKGROUND ART

As related art regarding coils for use in rotating electrical machines for automobiles etc., Patent Document 1 describes a technique of a rotating electrical machine having a stator. In the technique of Patent Document 1, the coil having the crank shaped portions is formed by winding a rectangular conductor around a hexagon bobbin to form a winding and then processing the winding using forming dies. The stator is manufactured by placing the coil having the crank shaped portions in a stator core.

Patent Document 2 describes a technique in which two coils of the same phase are connected by a bridge wire, and are placed in adjoining slots of the stator core so that the loops of the two coils of the same phase partially overlap each other.

RELATED ART DOCUMENTS

Patent Documents

[Patent Document 1] Japanese Patent Application Publication No. 2008-104293 (JP 2008-104293 A)
[Patent Document 2] Japanese Patent Application Publication No. 2009-195006 (JP 2009-195006 A)

SUMMARY OF THE INVENTION

Problem to be Solved by the Invention

In the techniques of Patent Documents 1 and 2, the coil is designed to have a lane change portion corresponding to the width of a unit of coil to avoid interference. For example, in the case of a coil having three loops, one unit of coil bypasses, at its lane change portion corresponding to the width of three loops of conductors, the other unit of coil to avoid interference. The width that can be used for the lane change portion is limited by the diameter of the stator core. Accordingly, as the number of loops of the coil increases, the size of the lane change portion is increased accordingly. This makes it difficult to provide the lane change portion extending in the radial direction of the stator core, and it may be necessary to provide the lane change portion extending in the axial direction of the stator core. This increases the size of a coil end, thereby increasing the size of the stator and a motor.

The present invention was developed to solve the above problem, and it is an object of the present invention to provide a method for manufacturing a coil, which is capable of manufacturing a coil that can reduce the size of a coil end of a stator.

Means for Solving the Problem

According to one aspect of the present invention developed in order to solve the above problem, a method for manufacturing a coil that is formed by winding a conductor in a loop shape and stacking loops of the conductor and that includes a slot placement portion to be placed in a slot of a stator core, and a coil end placement portion to be placed outside the slot is characterized by including: a winding step of forming a winding having a pair of expected slot placement portions corresponding to the slot placement portion and a pair of expected coil end placement portions corresponding to the coil end placement portion by winding the conductor in the loop shape and stacking the loops of the conductor so that a clearance having a size corresponding to a width of the conductor is provided between adjoining loops of the conductor; a protrusion forming step of forming the expected coil end placement portion into a protruding shape that protrudes in a radially outward direction of the winding; a crank forming step of forming, in the expected coil end placement portion, a stepped portion having a size corresponding to the width of the conductor in a stacking direction of the loops of the conductor; an opening step of forming the winding so that an interval between the pair of expected slot placement portions gradually increases in the stacking direction of the loops of the conductor; and an arc forming step of forming, in one or both of the pair of expected coil end placement portions, an arc-shaped portion curved in the stacking direction of the loops of the conductor.

According to this aspect, the coil can be manufactured in which the clearance having a size corresponding to the width of the conductor is provided between adjoining loops of the conductor and which includes, in the coil end placement portion, a lane change portion formed by the stepped portion having a size corresponding to the width of the conductor in the stacking direction of the loops of the conductor. This can reduce the size of a coil end of a stator. That is, when manufacturing a stator using the coil manufactured according to this aspect, each loop of the conductor of the other coil of two adjoining coils can be inserted in the clearance between adjoining loops of the conductor of one coil. Accordingly, the loops of the rectangular conductors of the adjoining two coils can be alternately arranged. Moreover, each loop of the conductor of one of the two adjoining coils can bypass a single loop of the conductor of the other coil, at the lane change portions provided in the lead-side coil end placement portion and the opposite-side coil end placement portion of the one coil. Accordingly, each loop of the conductor of the coil needs not to bypass, at the lane change portion thereof, a plurality of loops of the conductor as in the related art, and the lane change portion needs not to be provided to extend in the axial direction of the stator core. This can reduce the height in the axial direction of the coil end of the stator. As described above, according to this aspect, the coil capable of reducing the size of the coil end of the stator can be manufactured.

The order of the steps may be changed as appropriate. Accordingly, for example, the expected coil end placement portion in the opening step or the arc forming step includes an expected coil end placement portion that has already been formed into a protruding shape, an expected coil end placement portion in which a stepped portion has already been formed etc.

In the above aspect, it is preferable that the method for manufacturing the coil further include a 90° bending forming step of bending and forming the winding formed in the winding step so that the stacking direction of the loops of the conductor in one of the pair of expected coil end placement portions becomes perpendicular to that of the loops of the conductor in the other expected coil end placement portions.

According to this aspect, the coil can be inserted along an axial direction of the stator core when placing the coil into the stator core. Accordingly, a coil basket is formed by a plurality of coils, and then the coil basket can be inserted into the stator core along the axial direction of the stator core. This can simplify the manufacturing process of the stator.

In the above aspect, it is preferable that the 90° bending forming step be performed before the opening step.

According to this aspect, deformation of the expected coil end placement portion can be prevented which is caused by performing the opening step before the 90° bending forming step. Accordingly, the expected coil end placement portion can be formed into a desired shape.

In the above aspect, it is preferable that the opening step and the arc forming step be performed simultaneously.

According to this aspect, the number of steps can be reduced, whereby manufacturing time of the coil can be reduced.

Effects of the Invention

In the method for manufacturing a coil according to the present invention, a coil capable of reducing the size of a coil end of a stator can be manufactured.

BRIEF DESCRIPTION OF THE DRAWINGS

FIG. 5 is a side view of the forming dies before forming by the winding step.
FIG. 6 is a top view of the forming dies before forming by the winding step.

MODES FOR CARRYING OUT THE INVENTION

Figure 1:
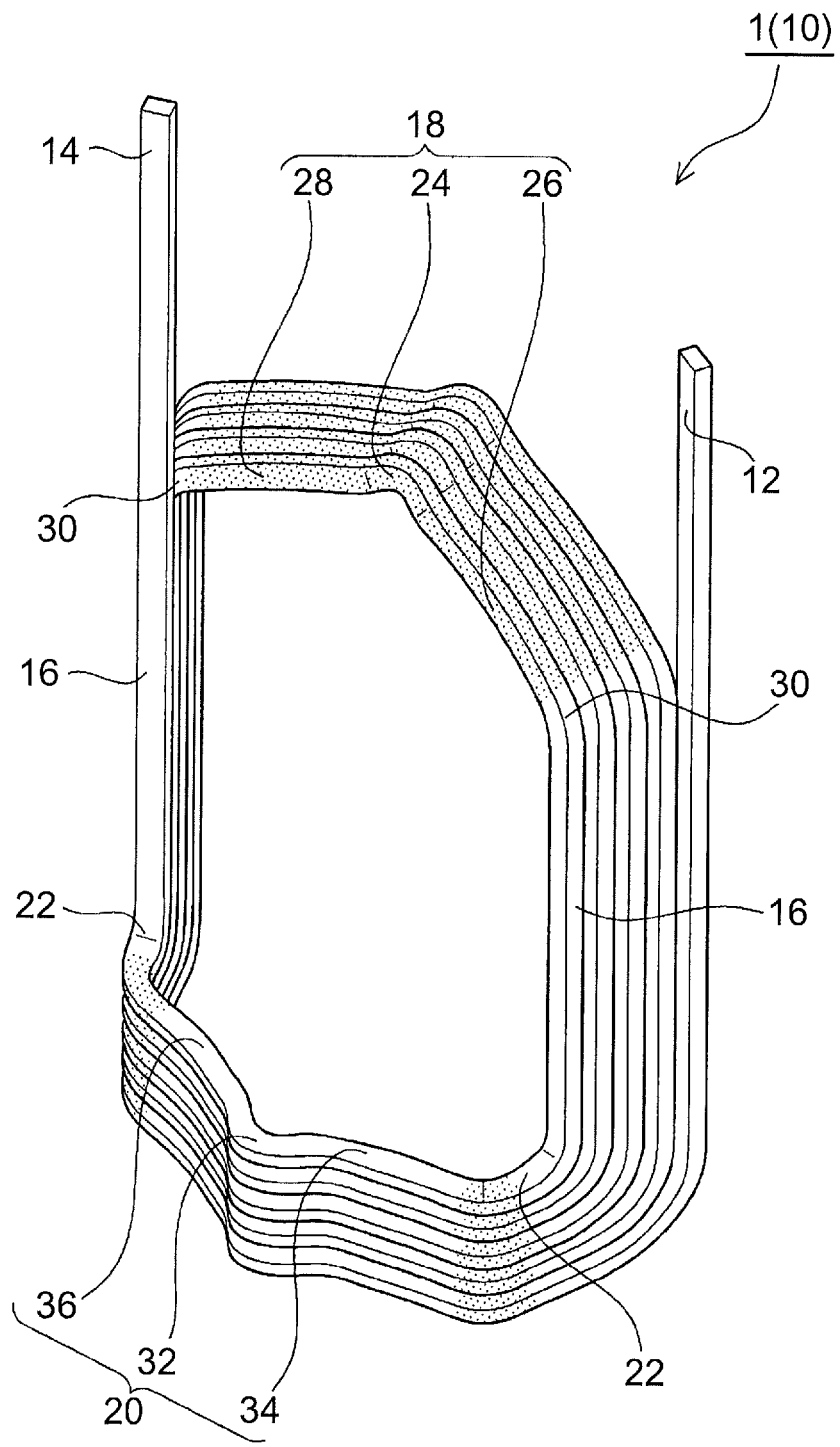
FIG. 1 is a perspective view showing the appearance of a coil.
Figure 2:
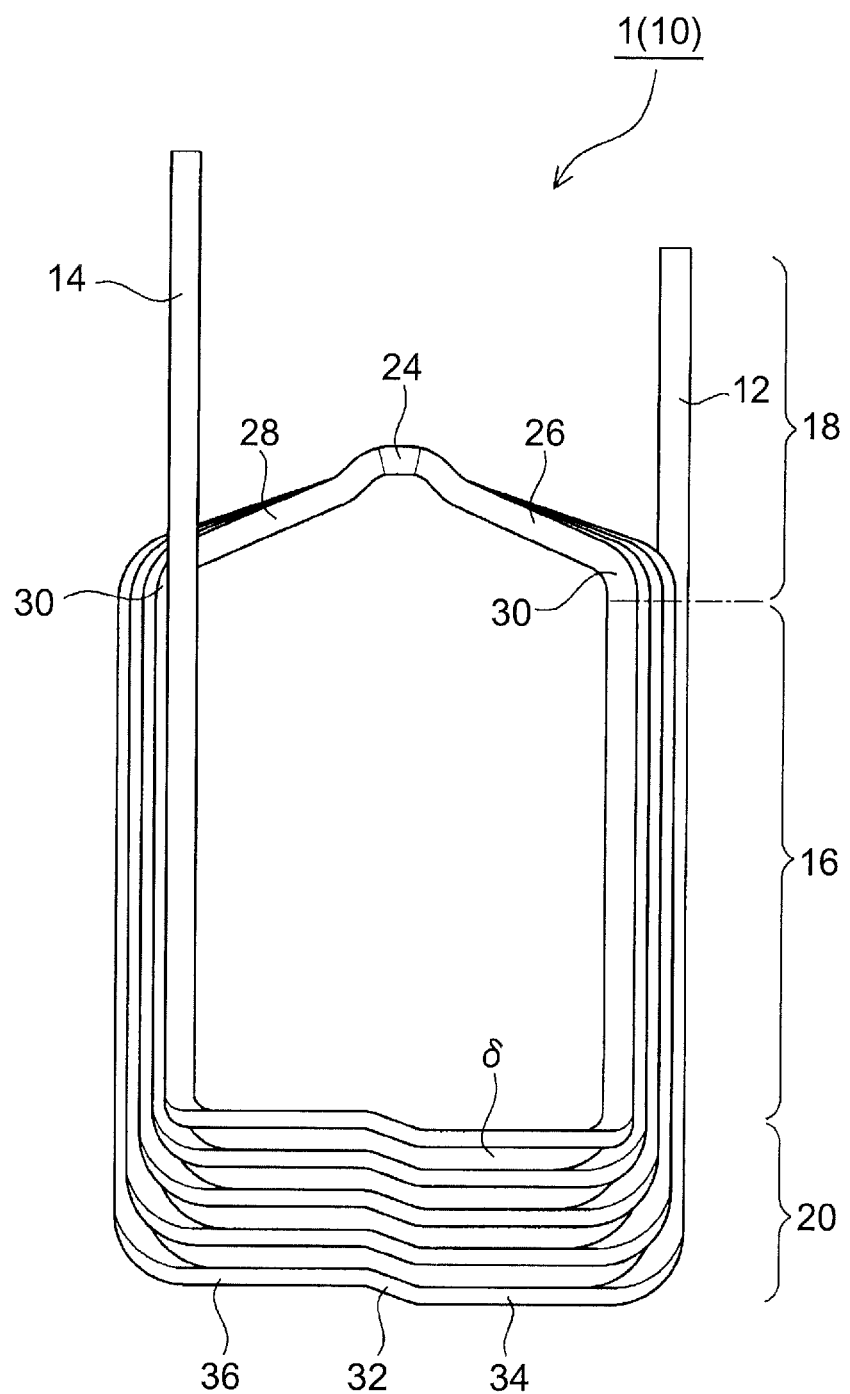
FIG. 2 is a front view of the coil.
Figure 3:
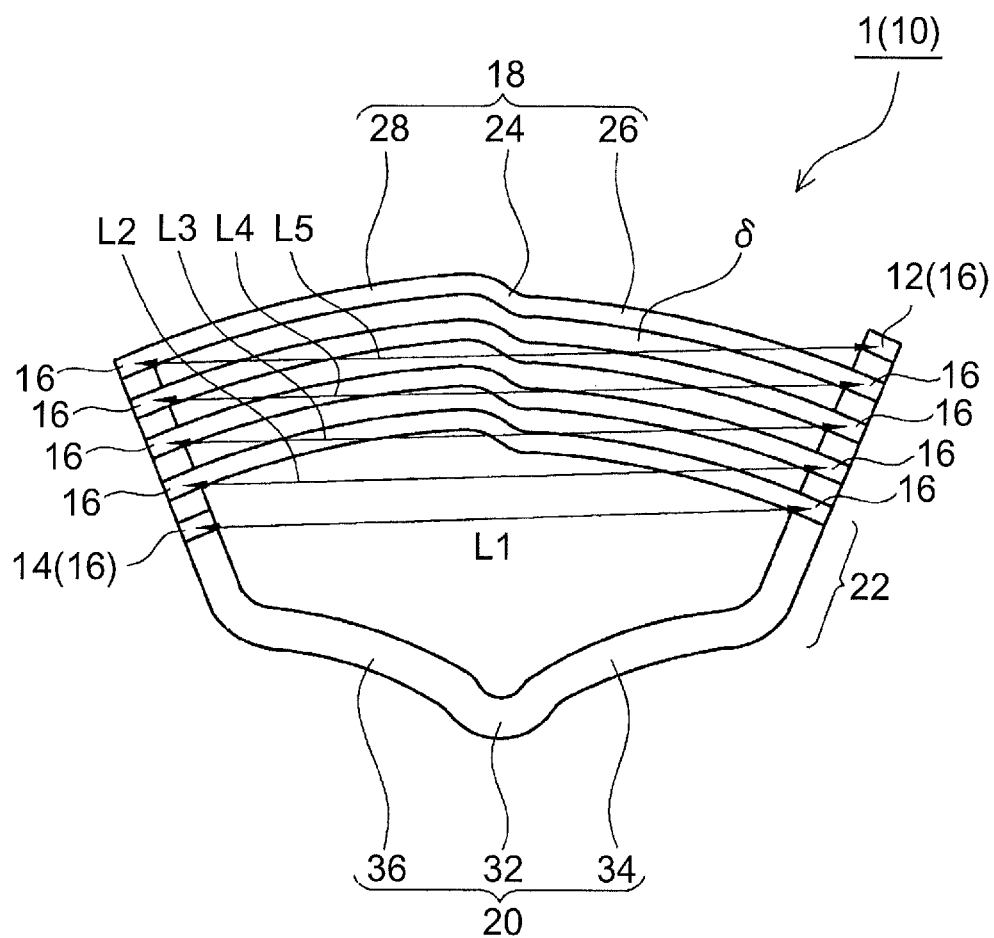
FIG. 3 is a top view of the coil.

An embodiment of the present invention will be described in detail with reference to the accompanying drawings.
[Structure of Coil]
First, the structure of a coil 1 according to the present embodiment will be described. FIG. 1 is a perspective view showing the appearance of the coil 1, FIG. 2 is a front view of the coil 1, and FIG. 3 is a top view of the coil 1. The shaded part in FIG. 1 shows a portion where a rectangular conductor 10 is deformed in an opening/arc forming step described below. The coil 1 is formed by the rectangular conductor 10. The rectangular conductor 10 is a wire having a rectangular section and comprised of a highly conductive metal such as copper or aluminum, and is covered with an insulating cover material such as enamel. The coil 1 is manufactured by performing edgewise bending or flatwise bending on the rectangular conductor 10. As used herein, the "edgewise bending" is a process of forming the coil 1 by bending the rectangular conductor 10 in the short-side direction thereof so that one of those surfaces of the rectangular conductor 10 which correspond to the shorter sides of the rectangular section serves as an inner peripheral surface and the other surface serves as an outer peripheral surface. The "flatwise bending" is a process of forming the coil 1 by bending the rectangular conductor 10 in the longer-side direction thereof so that one of those surfaces of the rectangular conductor 10 which correspond to the longer sides of the rectangular section serves as an inner peripheral surface and the other surface serves as an outer peripheral surface.

As shown in FIGS. 1 to 3, the coil 1 is formed by winding the rectangular conductor 10 in a loop shape and stacking loops of the rectangular conductor 10. This coil 1 includes clearance δ between adjoining loops of the rectangular conductor 10 in the stacking direction of the loops of the rectangular conductor 10. This clearance δ is sized so that the rectangular conductor 10 can be inserted therein. Specifically, the size of the clearance δ corresponds to the length of the shorter side of the rectangular section of the rectangular conductor 10. The coil 1 includes an end 12, an end 14, slot placement portions 16, a lead-side coil end placement portion 18, and an opposite-side coil end placement portion 20, bent portions 22 etc.

Figure 44:
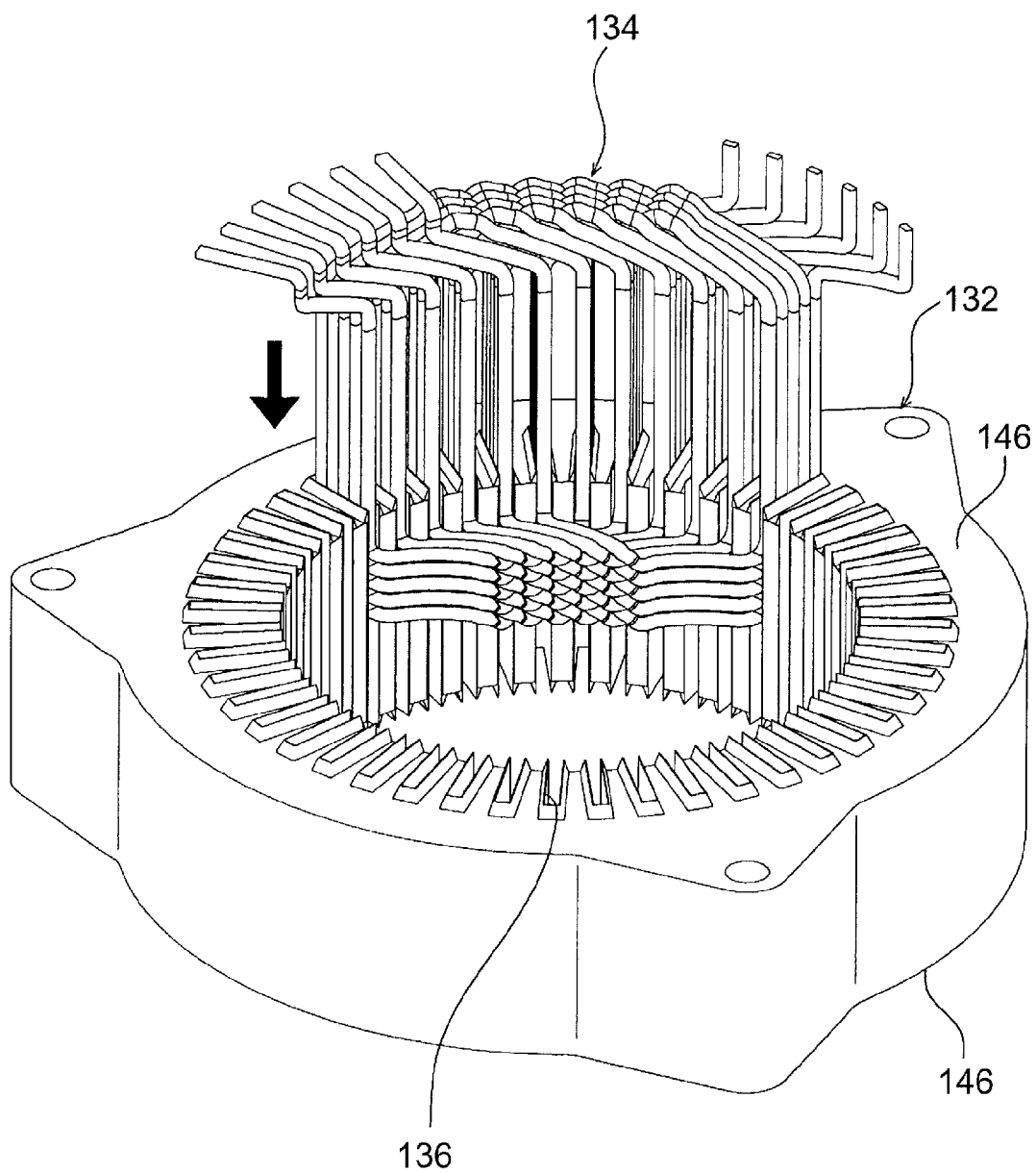
FIG. 44 is a perspective view showing the state where a part of the coil basket is inserted into the stator core.

The slot placement portion 16 is a portion that is placed in a slot 136 (see FIG. 44) when the coil 1 is placed in a stator core 132 (see FIG. 44). As shown in FIGS. 1 and 2, the slot placement portion 16 is formed in a linear shape in the vertical direction of the figures.

The lead-side coil end placement portion 18 is a portion that is placed outside the slots 136 (see FIG. 44) when the coil 1 is placed in the stator core 132 (see FIG. 44). As shown in FIGS. 1 to 3, this lead-side coil end placement portion 18 includes a lane change portion 24, a first edge 26, a second edge 28 etc. As shown in FIG. 3, each of the first edge 26 and the second edge 28 is an arc-shaped portion that is curved in the stacking direction of the loops of the rectangular conductor 10 (the upward direction in FIG. 3).

As shown in FIG. 3, the lane change portion 24 is located substantially in the central portion (the central portion or the vicinity thereof) of the lead-side coil end placement portion 18, and is formed by a stepped portion having a size corresponding to the length of the shorter side of the rectangular section of the rectangular conductor 10 in the stacking direction of the loops of the rectangular conductor 10 (the vertical direction in FIG. 3). The stacking direction of the loops of the rectangular conductor 10 in the lead-side coil end placement portion 18 (the vertical direction in FIG. 3) is the radial direction of the stator core 132 when the coil 1 is placed in the stator core 132 (see FIG. 44).

As shown in FIGS. 1 and 2, each of the first edge 26 and the second edge 28 has a round portion 30. This round portion 30 is formed in an arc shape in the circumferential direction of the coil 1 in an end of the first edge 26 where the first edge 26 is connected to the slot placement portion 16, and is formed in an arc shape in the circumferential direction of the coil 1 in an end of the second edge 28 where the second edge 28 is connected to the slot placement portion 16. The lead-side coil end placement portion 18 is placed on the side on which a power supply lead wire (not shown) is connected, with respect to an axial end face 146 (see FIG. 44) of the stator core 132.

The opposite-side coil end placement portion 20 is a portion that is placed outside the slots 136 (see FIG. 44) when the coil 1 is placed in the stator core 132 (see FIG. 44). As shown in FIGS. 1 to 3, this opposite-side coil end placement portion 20 includes a lane change portion 32, a first edge 34, a second edge 36 etc.

As shown in FIG. 2, the lane change portion 32 is located substantially in the central portion (the central portion or the vicinity thereof) of the opposite-side coil end placement portion 20, and is formed by a stepped portion having a size corresponding to the length of the shorter side of the rectangular section of the rectangular conductor 10 in the stacking direction of the loops of the rectangular conductor 10 (the vertical direction in FIG. 2). The stacking direction of the loops of the rectangular conductor 10 in the opposite-side coil end placement portion 20 (the vertical direction in FIG. 2) is the axial direction of the stator core 132 when the coil 1 is placed in the stator core 132 (see FIG. 44).

The bent portion 22 is a portion formed so as to cause the opposite-side coil end placement portion 20 to protrude from the slot placement portion 16 toward the inside of an annular coil basket 134 (see FIG. 44) when the coil basket 134 is formed using the coil 1. Since the coil 1 has the bent portions 22, the stacking direction of the loops of the rectangular conductor 10 in the lead-side coil end placement portion 18 is perpendicular to that of the loops of the rectangular conductor 10 in the opposite-side coil end placement portion 20.

The coil 1 thus has the clearance δ between adjoining ones of the loops of the rectangular conductor 10. This coil 1 includes in the lead-side coil end placement portion 18 the lane change portion 24 that is formed by a stepped portion having a size corresponding to the length of the shorter side of the rectangular section of the rectangular conductor 10, and includes in the opposite-side coil end placement portion 20 the lane change portion 32 that is formed by a stepped portion having a size corresponding to the length of the shorter side of the rectangular section of the rectangular conductor 10. This allows a coil end of a stator 130 to be reduced in size, as described in detail below.

[Manufacturing Method of Coil]

A method for manufacturing the coil 1 having the above structure will be described. A winding step, a protrusion forming step, and a crank forming step, a 90° bending forming step, and an opening/arc forming step are sequentially performed in this order in the manufacturing method of the coil 1.

(Winding Step)

Figure 4:
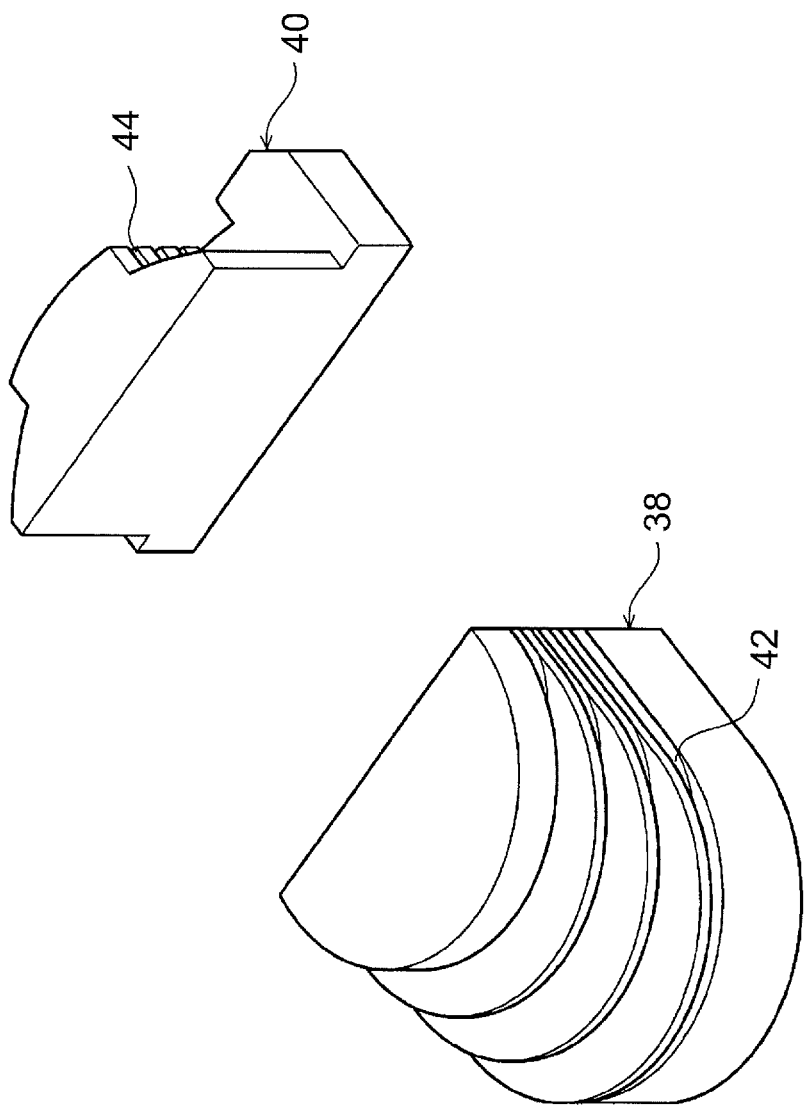
FIG. 4 is a perspective view showing the appearance of forming dies before forming by a winding step.
Figure 7:
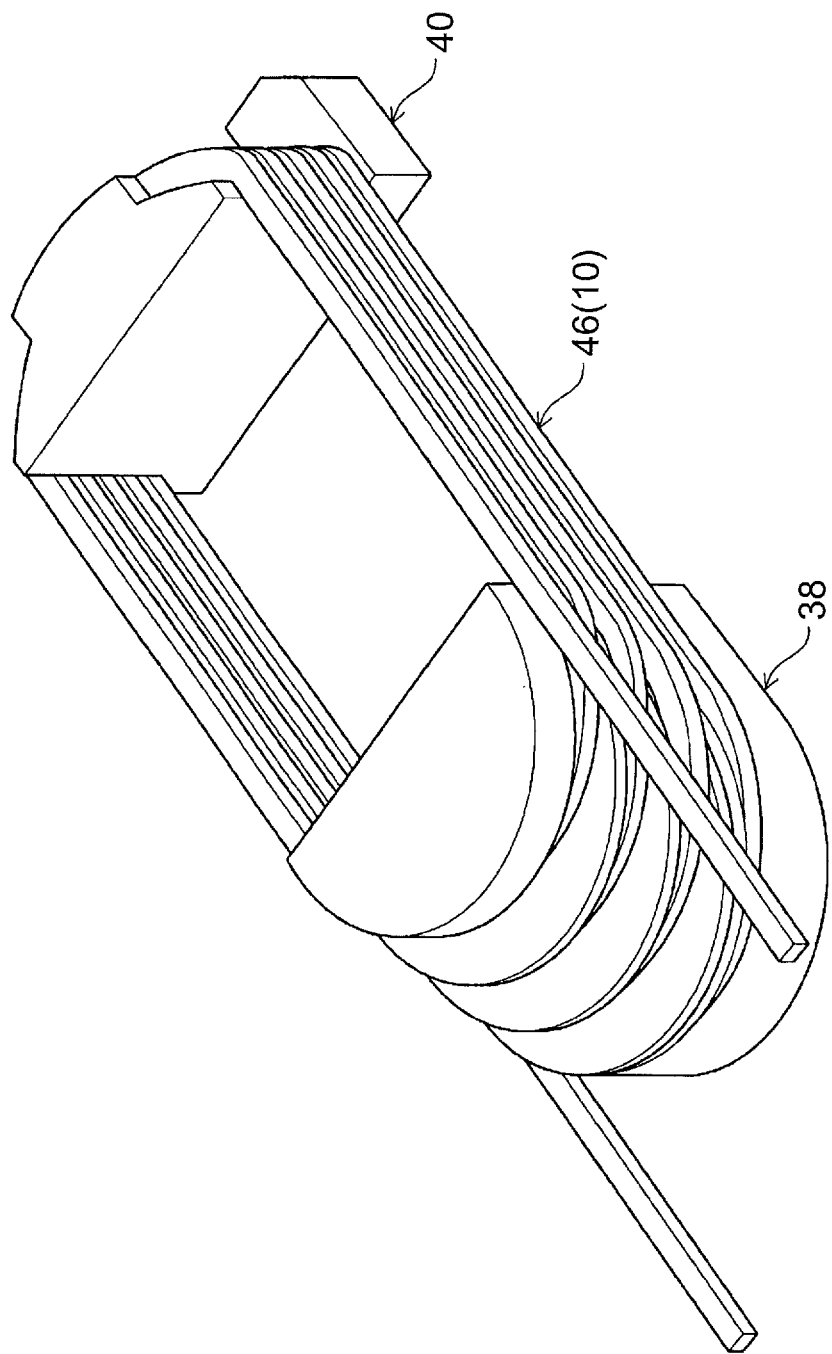
FIG. 7 is a perspective view showing the appearance of the forming dies and a winding after forming by the winding step.
Figure 8:
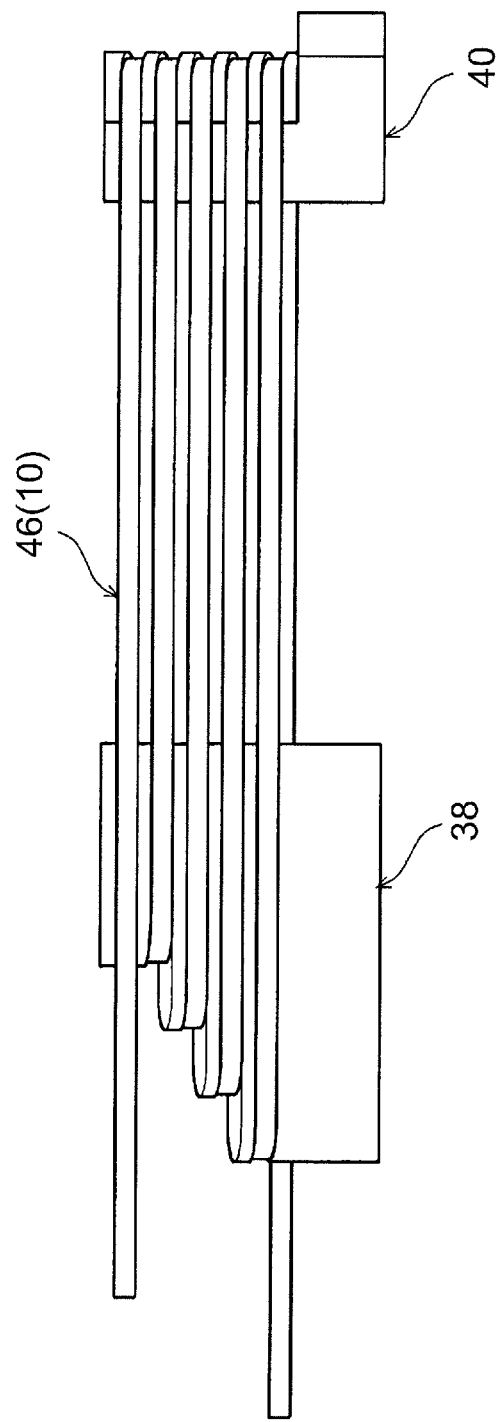
FIG. 8 is a side view of the forming dies and the winding after forming by the winding step.
Figure 9:
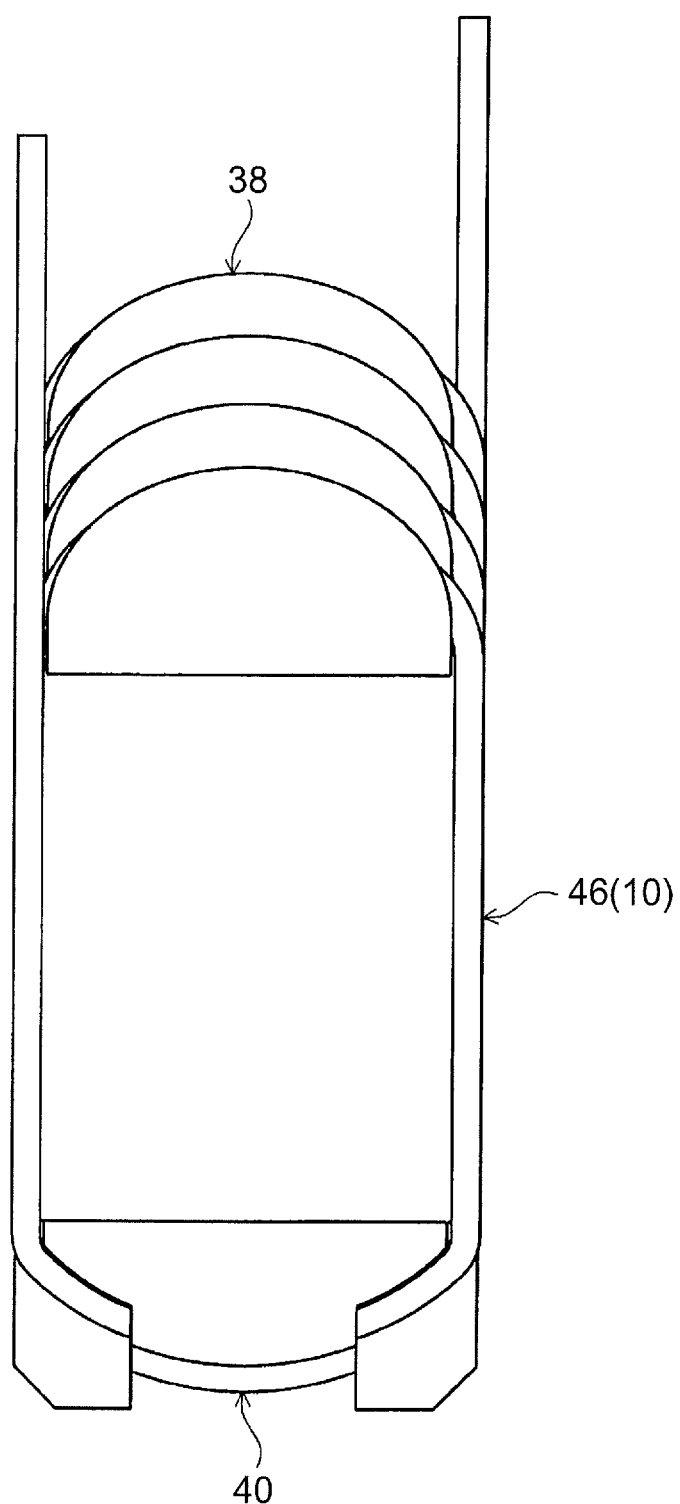
FIG. 9 is a top view of the forming dies and the winding after forming by the winding step.
Figure 10:
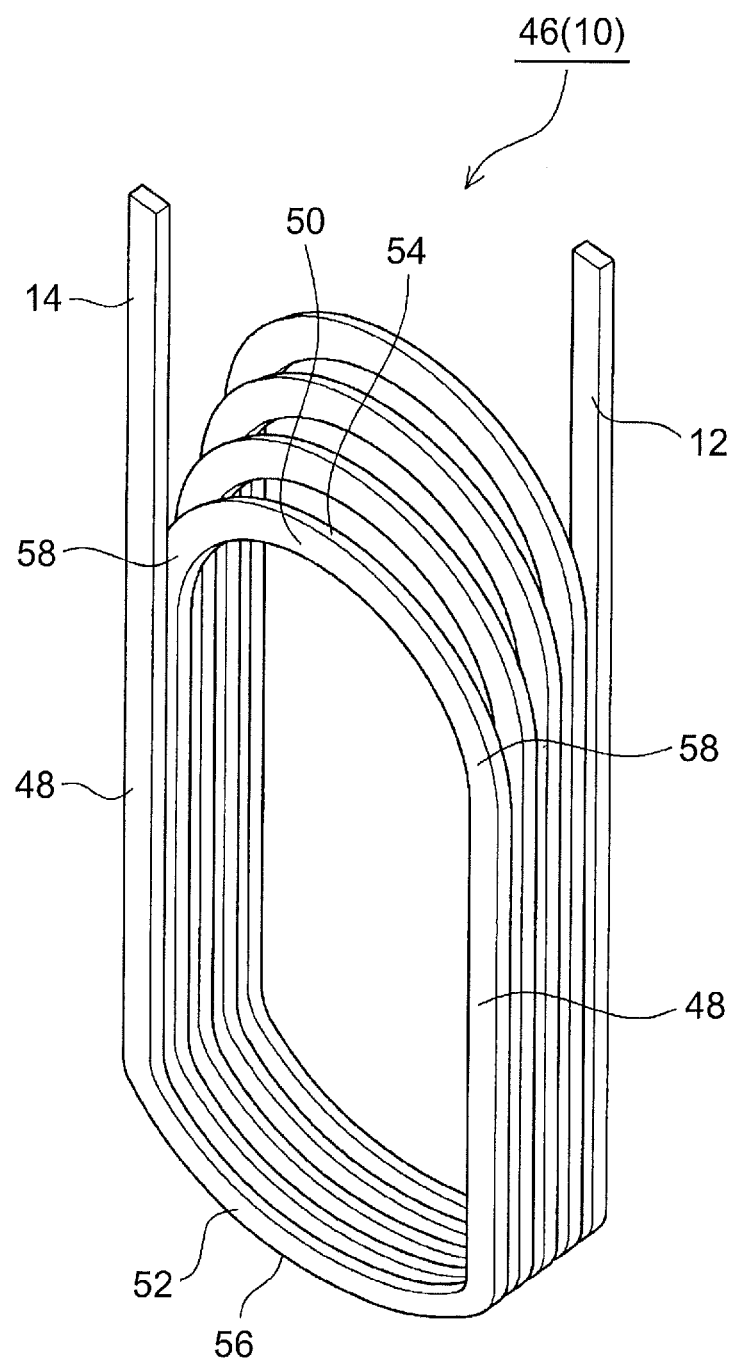
FIG. 10 is a perspective view showing the appearance of the winding after forming by the winding step.
Figure 11:
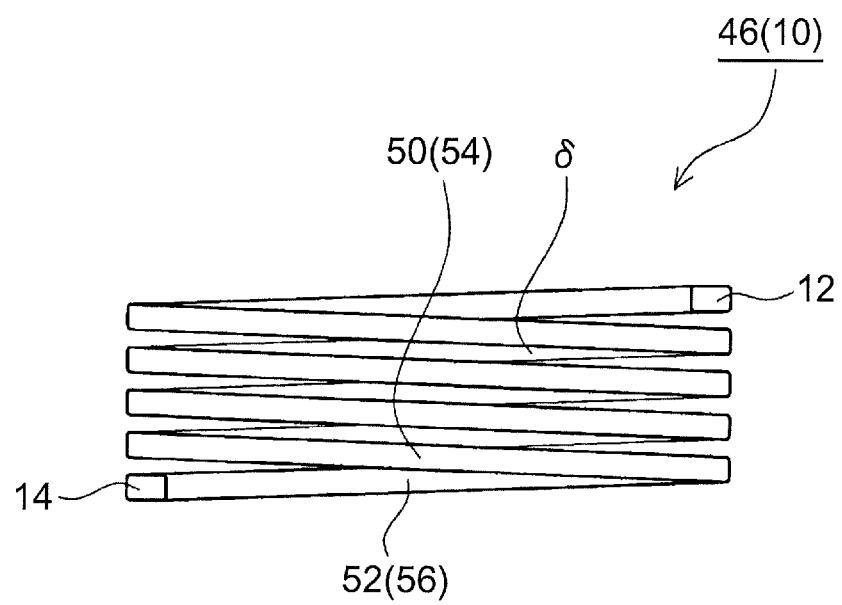
FIG. 11 is a top view of the winding after forming by the winding step.

First, the winding step will be described. FIGS. 4 to 6 show the state before forming by the winding step. FIG. 4 is a perspective view, showing the appearance of forming dies, FIG. 5 is a side view of the forming dies, and FIG. 6 is a top view of the forming dies. FIGS. 7 to 9 show the state after forming by the winding step. FIG. 7 is a perspective view showing the appearance of the forming dies and a winding, FIG. 8 is a side view of the forming dies and the winding, and FIG. 9 is a top view of the forming dies and the winding. FIGS. 10 and 11 show the state after forming by the winding step. FIG. 10 is a perspective view showing the appearance of the winding, and FIG. 11 is a top view of the winding.

As shown in FIGS. 4 to 6, a first winding forming die 38 and a second winding forming die 40 are used in this winding step. The first winding forming die 38 has an arc-shaped groove 42. In the present embodiment, the first winding forming die 38 has four grooves 42 by way of example. As shown in FIG. 5, the four grooves 42 are arranged in a staircase pattern. The second winding forming die 40 has an arc-shaped groove 44. In the present embodiment, the second winding forming die 40 has five grooves 44 by way of example. The five grooves 44 are arranged in the vertical direction.

In this winding step, as shown in FIGS. 7 to 9, the rectangular conductor 10 is wound around the grooves 42 of the first winding forming die 38 and the grooves 44 of the second winding forming die 40 by edgewise bending. The rectangular conductor 10 is thus wound in a loop shape, and the loops of the rectangular conductor 10 are stacked.

A winding 46 having a shape as shown in FIGS. 10 and 11 is formed in this manner. As shown in FIGS. 10 and 11, the winding 46 thus formed has a rounded rectangular shape (oval shape) except the ends 12, 14. In the portion formed in the rounded rectangular shape, the winding 46 has expected slot placement portions 48 having a linear shape, an expected lead-side coil end placement portion 50 having an arc shape, and an expected opposite-side coil end placement portion 52 having an arc shape. The winding 46 has the clearance δ between adjoining loops of the rectangular conductor 10. This clearance δ is sized so that the rectangular conductor 10 can be inserted therein. Specifically, the size of the clearance δ corresponds to the length of the shorter side of the rectangular section of the rectangular conductor 10. The clearance δ to be included in the coil 1 of the final shape is thus formed in the winding step.

There is a lane change corresponding to the size of the clearance δ in each of the expected lead-side coil end placement portion 50 and the opposite-side coil end placement portion 52. The pair of expected slot placement portions 48 are formed so as to extend parallel to each other while shifted with respect to each other in the stacking direction of the loops of the rectangular conductor 10. The expected lead-side coil end placement portion 50 and the expected opposite-side coil end placement portion 52 are tilted as shown in FIG. 11.

The expected slot placement portions 48 are formed in the linear shape in the direction in which the expected lead-side coil end placement portion 50 and the expected opposite-side coil end placement portion 52 are arranged (the vertical direction in FIG. 10), and has a length required as the slot placement portion 16. The length required as the slot placement portion 16 is the length of the slot 136 (see FIG. 44) in the axial direction of the stator core 132 (the vertical direction in FIG. 44). Accordingly, forming of the expected slot placement portions 48 has been completed, and the expected lead-side coil end placement portion 50 and the expected opposite-side coil end placement portion 52 need only be formed in the forming step following the winding step. Therefore, after the winding step, the expected lead-side coil end placement portion 50 and the expected opposite-side coil end placement portion 52 can be formed based on the expected slot placement portions 48 that have already been formed. The expected lead-side coil end placement portion 50 and the expected opposite-side coil end placement portion 52 can thus be formed accurately.

The expected slot placement portion 48 is a portion corresponding to the slot placement portion 16 (see FIG. 1) of the coil 1. The winding 46 includes a pair of expected slot placement portions 48 facing each other on the circumference of the winding 46. In the example shown in FIGS. 10 and 11, the winding 46 includes a total of five pairs of the expected slot placement portions 48 by way of example.

The expected lead-side coil end placement portion 50 is a portion corresponding to the lead-side coil end placement portion 18 (see FIG. 1) of the coil 1. The expected lead-side coil end placement portion 50 together with the expected opposite-side coil end placement portion 52 form a pair of expected coil end placement portions facing each other on the circumference of the winding 46. In the example shown in FIGS. 10 and 11, the winding 46 includes a total of four expected lead-side coil end placement portions 50 by way of example. The positions of top parts 54 of the expected lead-side coil end placement portions 50 in the radially outward direction of the winding 46 (the vertical direction in FIG. 10) are shifted vertically with respect to each other in the stacking direction of the loops of the rectangular conductor 10 (the direction perpendicular to the plane of the paper in FIG. 10 and away from the viewer) so that each top part 54 located farther from the viewer is positioned higher. Thus, the positions of the top parts 54 in the radially outward direction of the winding 46 are aligned in the stacking direction of the loops of the rectangular conductor 10 after forming by the 90° bending forming step described below.

The expected lead-side coil end placement portion 50 includes expected round portions 58 at its connection ends with the expected slot placement portions 48. The expected round portion 58 is a portion corresponding to the round portion 30 (see FIGS. 1 and 2) of the coil 1, and is a portion formed in an arc shape in the circumferential direction of the winding 46. The expected round portion 58 is formed so as to have the same curvature as the round portion 30 of the coil 1. In the present embodiment, the coil 1 is manufactured without changing the curvature of the expected round portion 58 throughout the subsequent steps.

The expected opposite-side coil end placement portion 52 is a portion corresponding to the opposite-side coil end placement portion 20 (see FIG. 1) of the coil 1. The expected opposite-side coil end placement portion 52 together with the expected lead-side coil end placement portion 50 form a pair of expected coil end placement portions facing each other on the circumference of the winding 46. In the example shown in FIGS. 10 and 11, the winding 46 includes a total of four expected opposite-side coil end placement portions 52 by way of example. The positions of top parts 56 of the expected opposite-side coil end placement portions 52 in the radially outward direction of the winding 46 (the vertical direction in FIG. 10) are aligned with each other in the stacking direction of the loops of the rectangular conductor 10 (the direction perpendicular to the plane of the paper in FIG. 10 and away from the viewer). The positions of the top parts 56 of the expected opposite-side coil end placement portions 52 are controlled to be aligned with each other throughout the winding step and the steps described below. This improves dimensional accuracy of the opposite-side coil end placement portion 20 in the coil 1 of the final shape, and thus improves assembly capability of the coil basket 134 described below.

(Protrusion Forming Step)

Figure 12:
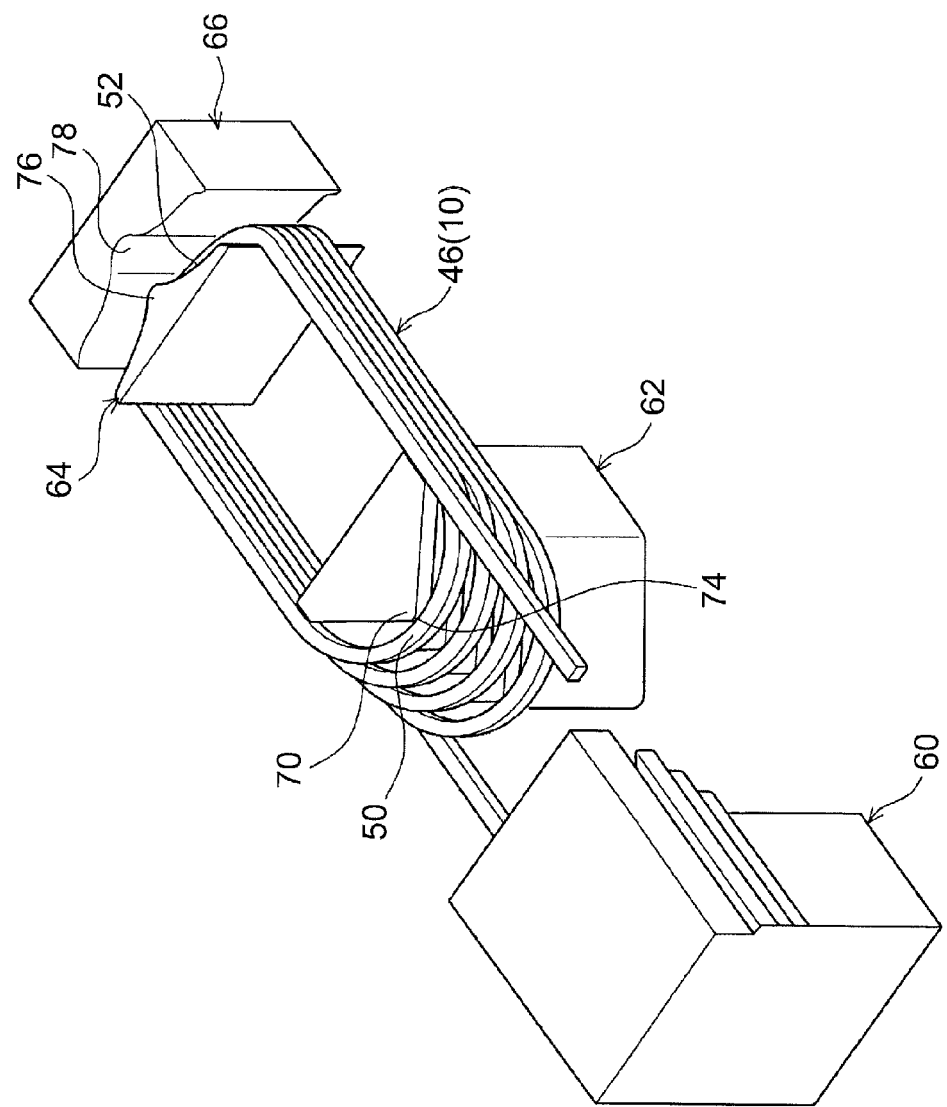
FIG. 12 is a perspective view showing the appearance of forming dies and the winding before forming by a protrusion forming step.
Figure 13:
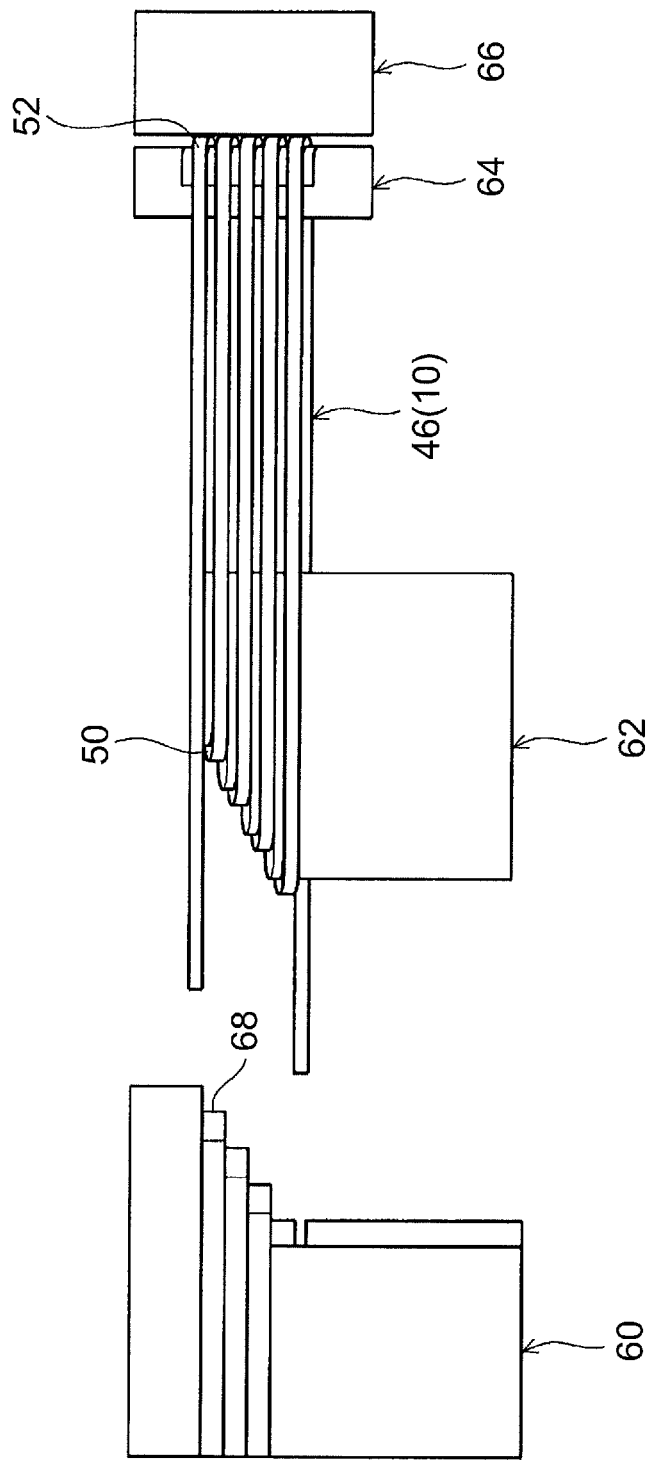
FIG. 13 is a side view of the forming dies and the winding before forming by the protrusion forming step.
Figure 14:
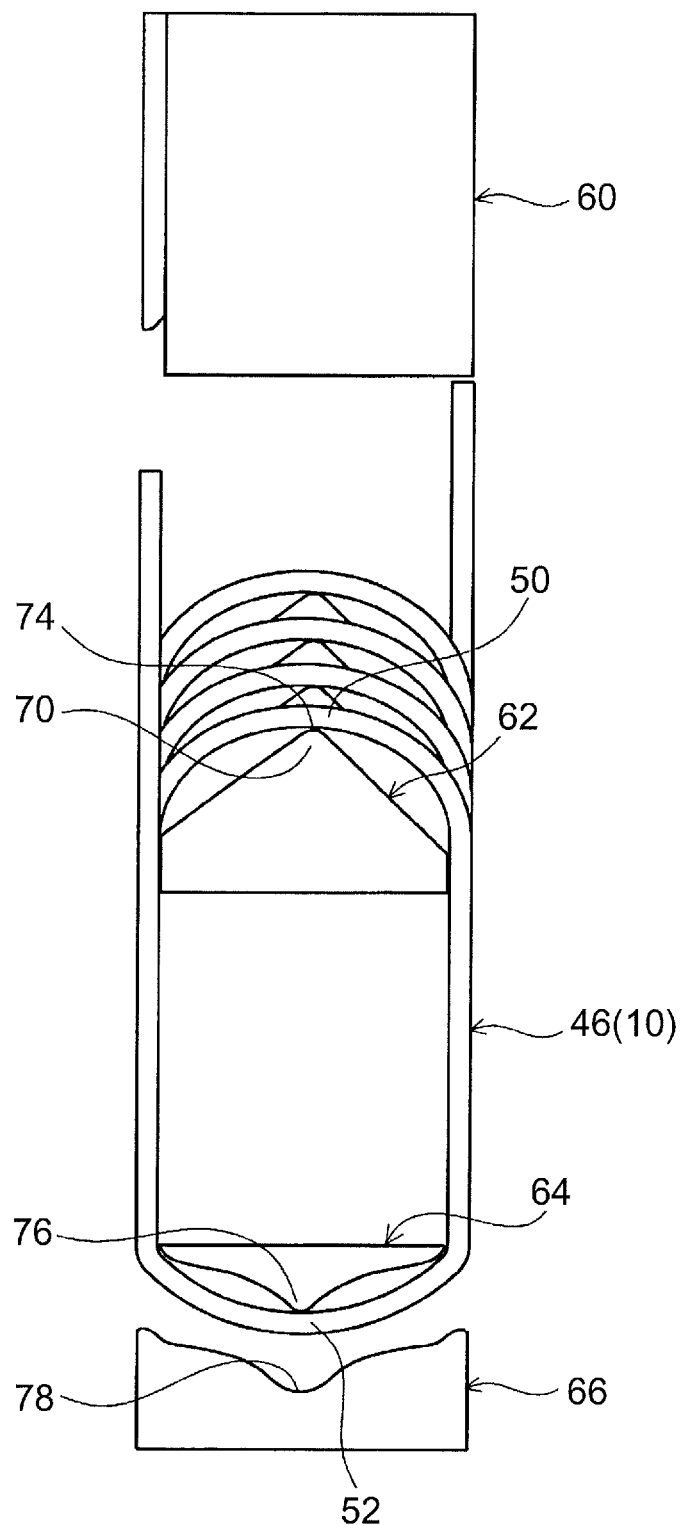
FIG. 14 is a top view of the forming dies and the winding before forming by the protrusion forming step.
Figure 15:
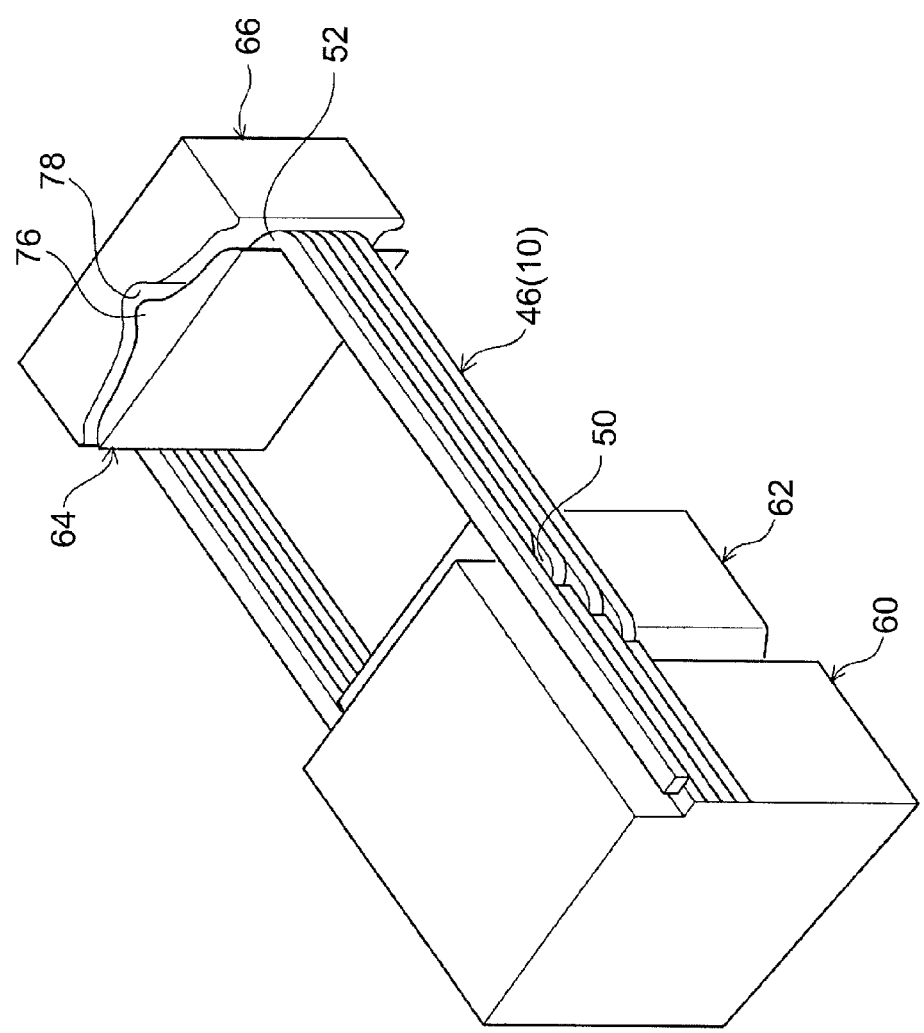
FIG. 15 is a perspective view showing the appearance of the forming dies and the winding after forming by the protrusion forming step.
Figure 16:
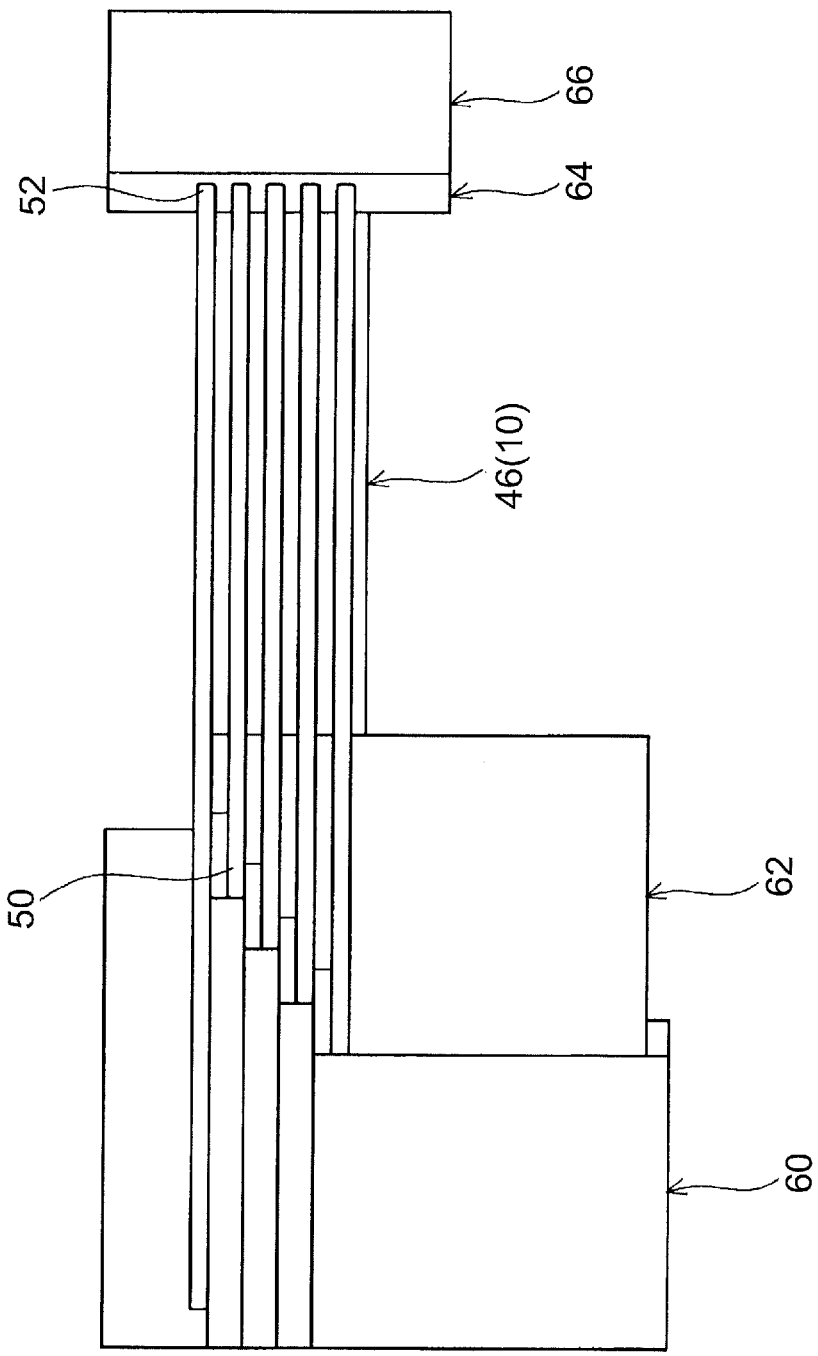
FIG. 16 is a side view of the forming dies and the winding after forming by the protrusion forming step.
Figure 17:
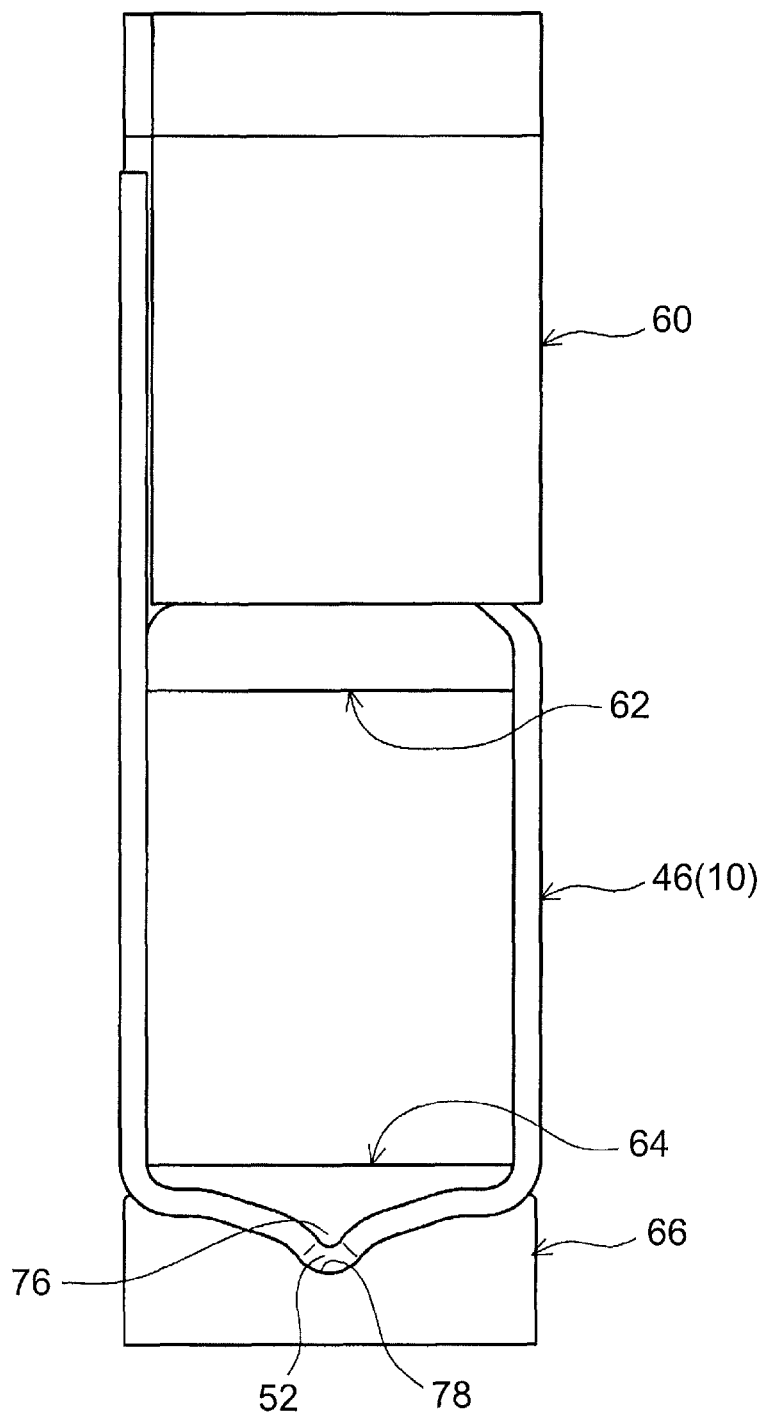
FIG. 17 is a top view of the forming dies and the winding after forming by the protrusion forming step.
Figure 18:
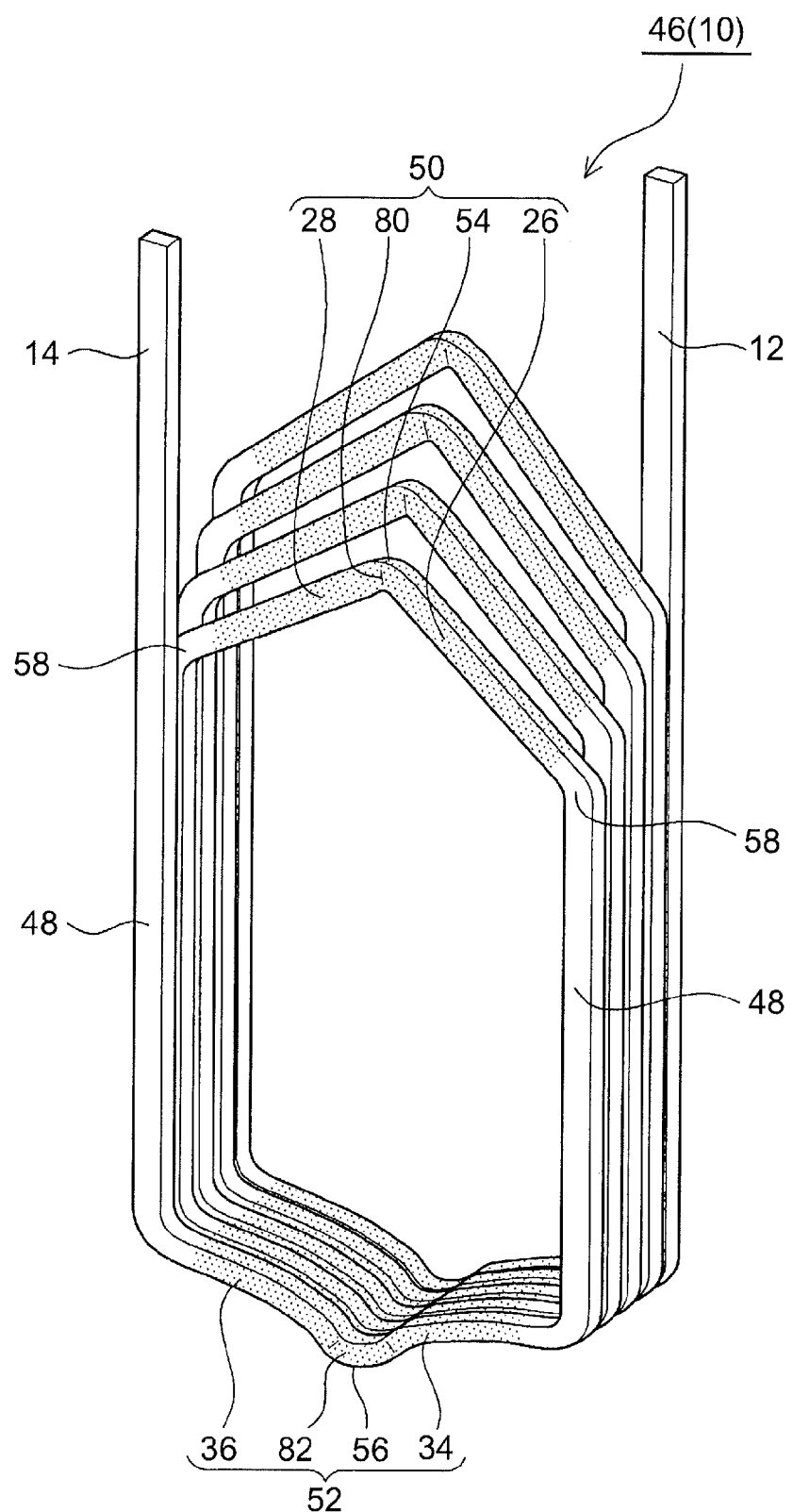
FIG. 18 is a perspective view showing the appearance of the winding after forming by the protrusion forming step.
Figure 19:
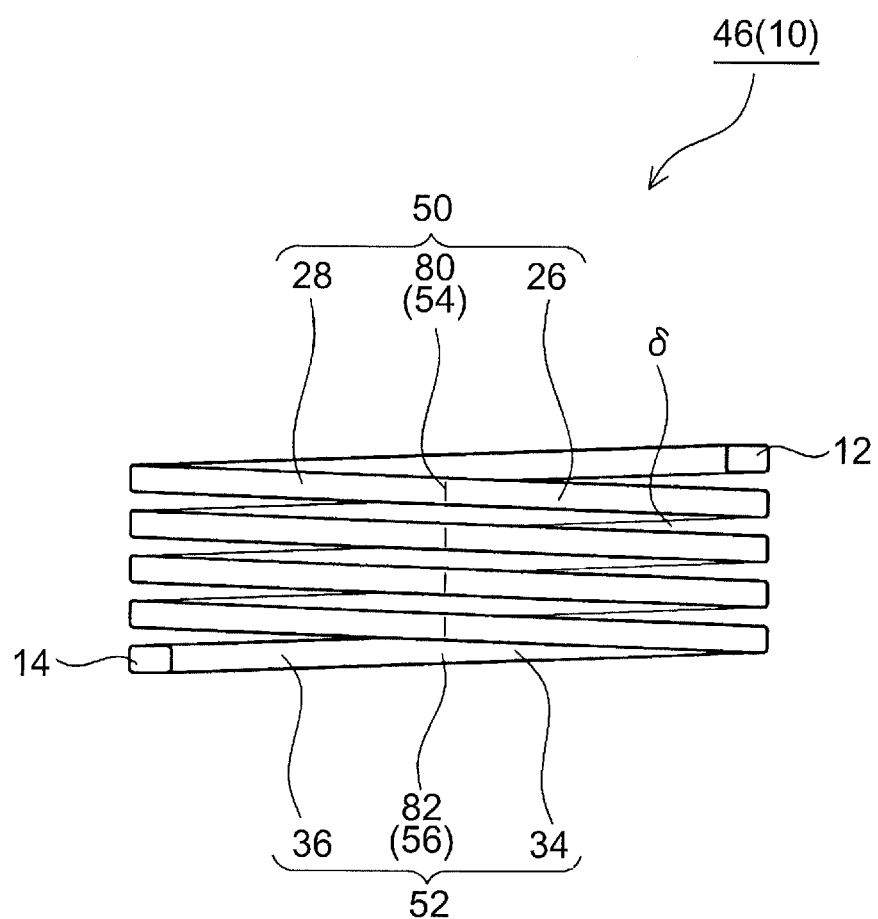
FIG. 19 is a top view of the winding after forming by the protrusion forming step.

The protrusion forming step will be described below. FIGS. 12 to 14 show the state before forming by the protrusion forming step. FIG. 12 is a perspective view showing the appearance of forming dies and the winding, FIG. 13 is a side view of the forming dies and the winding, and FIG. 14 is a top view of the forming dies and the winding. FIGS. 15 to 17 show the state after forming by the protrusion forming step. FIG. 15 is a perspective view showing the appearance of the forming dies and the winding, FIG. 16 is a side view of the forming dies and the winding, and FIG. 17 is a top view of the forming dies and the winding. FIGS. 18 and 19 show the state after forming by the protrusion forming step. FIG. 18 is a perspective view showing the appearance of the winding, and FIG. 19 is a top view of the winding. The shaded part in FIG. 18 shows a portion where the rectangular conductor 10 is deformed in the protrusion forming step.

As shown in FIGS. 12 to 14, a first protrusion forming die 60, a second protrusion forming die 62, a third protrusion forming die 64, and a fourth protrusion forming die 66 are used in the protrusion forming step. The first protrusion forming die 60 has a recessed portion 68 that can be fitted on a protruding portion 70 of the second forming die 62. In the present embodiment, the first protrusion forming die 60 has four recessed portions 68 by way of example. The four recessed portions 68 are arranged so that their bottoms (not shown) form a staircase pattern. The second protrusion forming die 62 has the protruding portion 70 that can be fitted in the recessed portion 68 of the first protrusion forming die 60. In the present embodiment, the second protrusion forming die 62 has four protruding portions 70 by way of example. The four protruding portions 70 are arranged so that their top portions 74 form a staircase pattern so as to correspond to the bottoms (not shown) of the recessed portions 68 which are arranged in the staircase pattern. The third protrusion forming die 64 has a protruding portion 76 that can be fitted in a recessed portion 78 of the fourth protrusion forming die 66 described below. The fourth protrusion forming die 66 has the recessed portion 78 that can be fitted on the protruding portion 76 of the third protrusion forming die 64.

In this protrusion forming step, as shown in FIGS. 15 to 17, the expected lead-side coil end placement portions 50 are sandwiched between the first protrusion forming die 60 and the second protrusion forming die 62 from the state shown in FIGS. 12 to 14 and the first protrusion forming die 60 is fitted on the second protrusion forming die 62. The expected opposite-side coil end placement portions 52 are interposed between the third protrusion forming die 64 and the fourth protrusion forming die 66, and the third protrusion forming die 64 is fitted in the fourth protrusion forming die 66.

The winding 46 is thus formed into the shape shown in FIGS. 18 and 19. In the winding 46 thus formed, as shown in FIGS. 18 and 19, each of the expected lead-side coil end placement portion 50 and the expected opposite-side coil end placement portion 52 has a protruding shape protruding in the radially outward direction of the winding 46 (the vertical direction in FIG. 18). As shown in FIG. 19, the clearance δ is maintained between adjoining loops of the rectangular conductor 10.

Each of the expected lead-side coil end placement portions 50 is formed so as to have a protruding portion 80 substantially in the central portion thereof (the central portion or the vicinity thereof) and to have the first edge 26 and the second edge 28 on both sides of the protruding portion 80. The positions of the top parts 54 of the expected lead-side coil end placement portions 50 in the radially outward direction of the winding 46 (the vertical direction in FIG. 10) are shifted vertically with respect to each other in the stacking direction of the loops of the rectangular conductor 10 (the direction perpendicular to the plane of the paper in FIG. 10 and away from the viewer) so that each top part 54 located farther from the viewer is positioned higher.

Each of the expected opposite-side coil end placement portions 52 is formed so as to have a protruding portion 82 substantially in the central portion thereof (the central portion or the vicinity thereof) and to have the first edge 34 and the second edge 36 on both sides of the protruding portion 82. The positions of the top parts 56 of the expected opposite-side coil end placement portions 52 in the radially outward direction of the winding 46 (the vertical direction in FIG. 18) are aligned with respect to each other in the stacking direction of the loops of the rectangular conductor 10 (the direction perpendicular to the plane of the paper in FIG. 18 and away from the viewer).

(Crank Forming Step)

Figure 20:
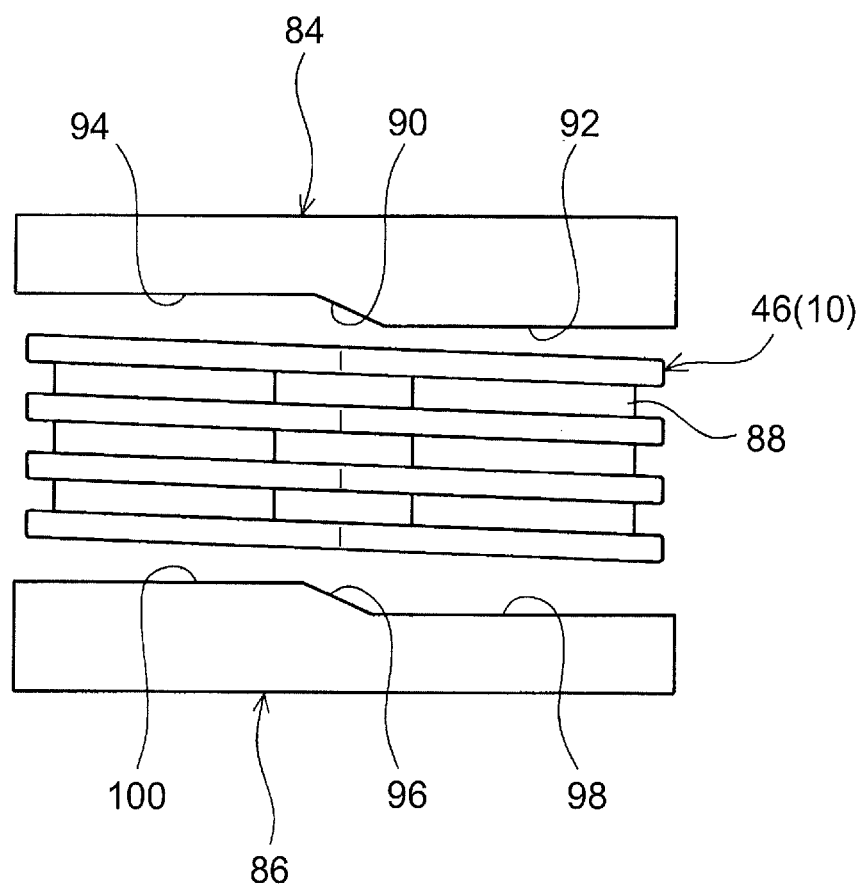
FIG. 20 is a schematic view of forming dies and the winding before forming by a crank forming step.
Figure 21:
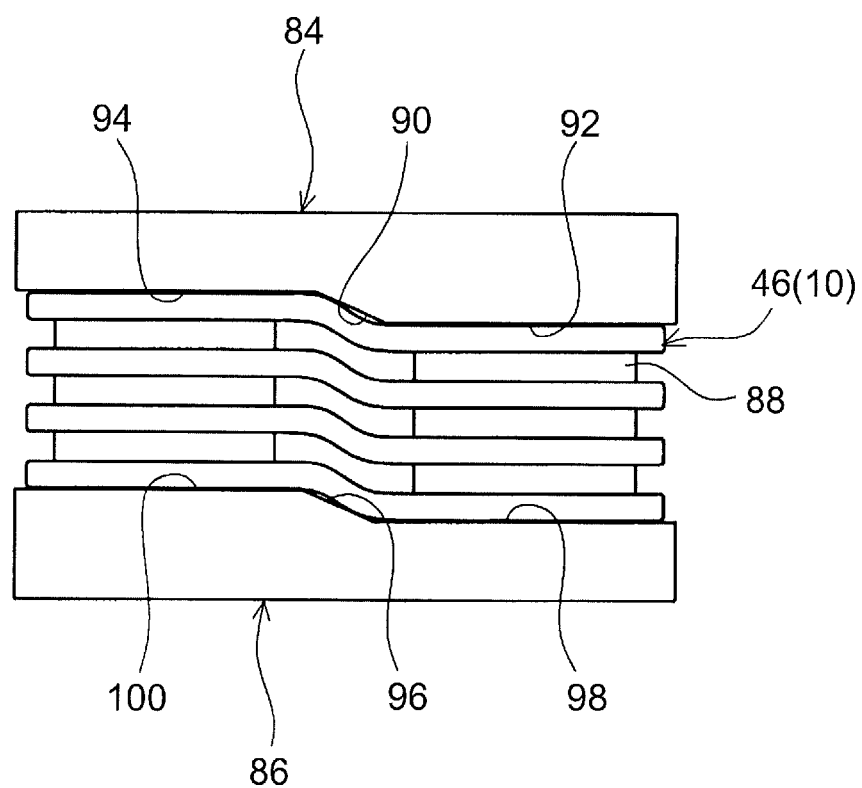
FIG. 21 is a schematic view of the forming dies and the winding after forming by the crank forming step.
Figure 22:
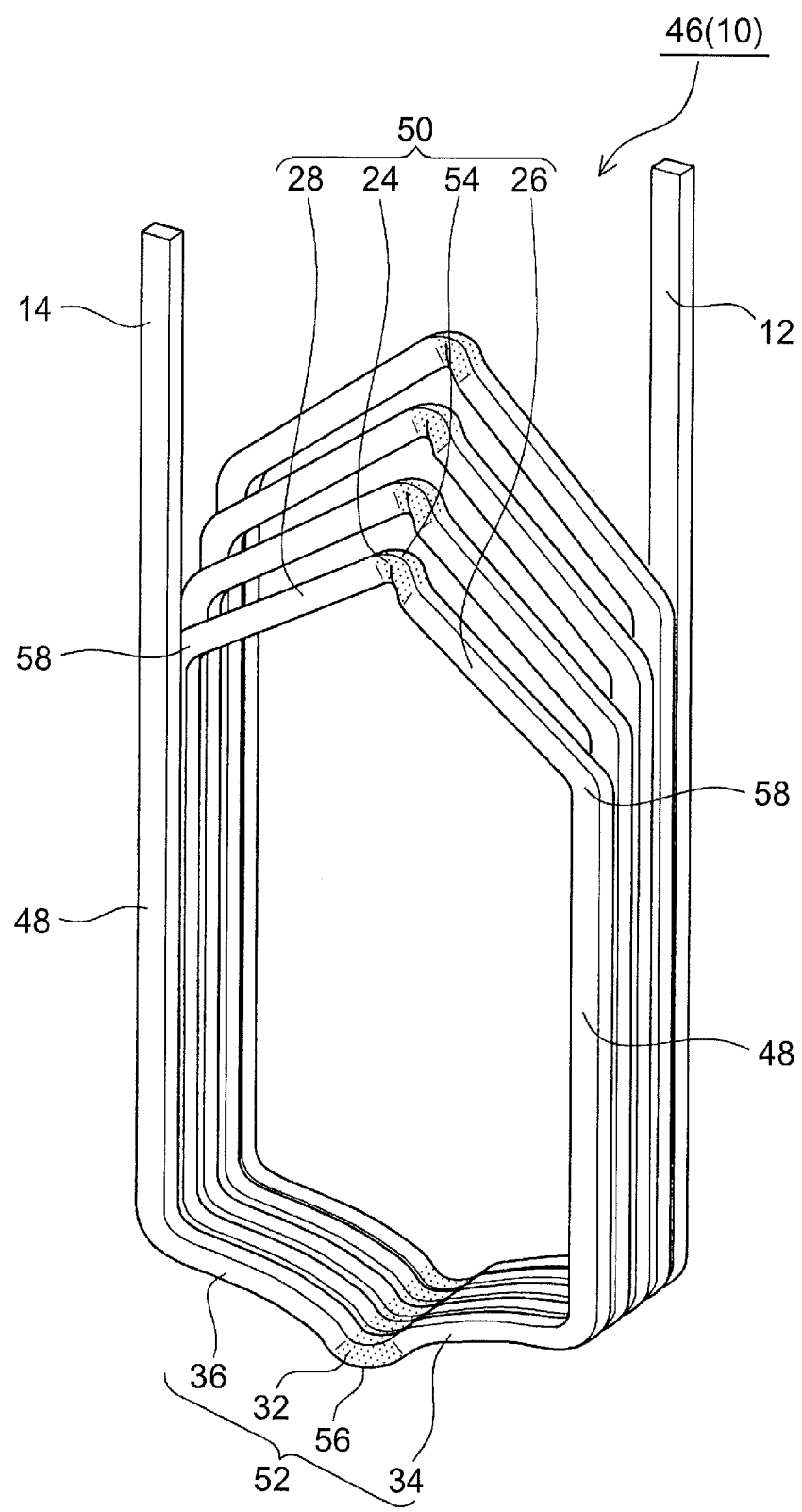
FIG. 22 is a perspective view showing the appearance of the winding after forming by the crank forming step.
Figure 23:
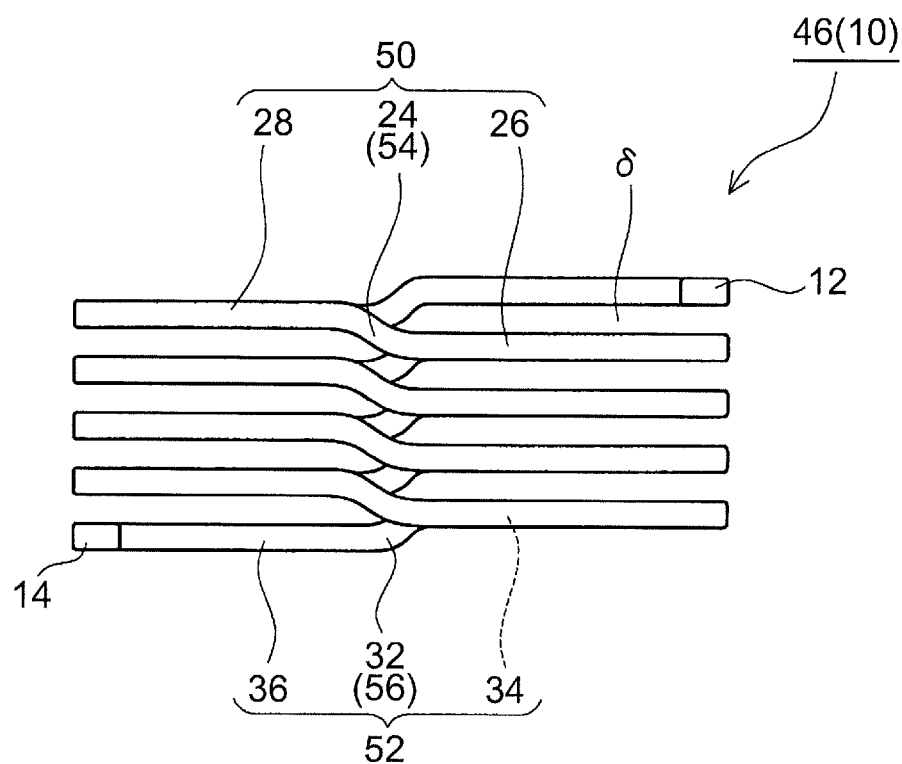
FIG. 23 is a top view of the winding after forming by the crank forming step.

The crank forming step will be described below. FIG. 20 is a schematic view of forming dies and the winding before forming by the crank forming step, and FIG. 21 is a perspective view showing the appearance of the forming dies and the winding after forming by the crank forming step. FIGS. 22 and 23 show the state after forming by the crank forming step. FIG. 22 is a perspective view showing the appearance of the winding, and FIG. 23 is a top view of the winding. The shaded part in FIG. 22 shows a portion where the rectangular conductor 10 is deformed in the crank forming step.

As shown in FIG. 20, a first crank forming die 84, a second crank forming die 86, and dummy plates 88 are used in this crank forming step. The first crank forming die 84 has a stepped portion 90 between a first flat portion 92 and a second flat portion 94. The second crank forming die 86 has a stepped portion 96 between a first flat portion 98 and a second flat portion 100. The dummy plates 88 are, e.g., plate-like members made of the same material as the rectangular conductor 10. The dummy plates 88 are each placed in clearance δ between adjoining loops of the rectangular conductor 10 between the first crank forming die 84 and the second crank forming die 86.

In this crank forming step, as shown in FIG. 21, the winding 46 is pressed by the first crank forming die 84 and the second crank forming die 86 from the state shown in FIG. 20.

The winding 46 is thus formed into the shape shown in FIGS. 22 and 23. As shown in FIGS. 22 and 23, the winding 46 thus formed has the lane change portions 24, 32 formed in the lead-side coil end placement portions 50 and the opposite-side coil end placement portions 52, respectively, as stepped portions having a size corresponding to the length of the shorter side of the rectangular section of the rectangular conductor 10 in the stacking direction of the loops of the rectangular conductor 10 (the vertical direction in FIG. 23). The lane change portion 24 is formed between the first edge 26 and the second edge 28 in the expected lead-side coil end portion 50. The lane change portion 32 is formed between the first edge 34 and the second edge 36 in the expected opposite-side coil end portion 52. As shown in FIG. 23, the clearance δ is maintained between adjoining loops of the rectangular conductor 10. As shown in FIG. 23, the lane change portion 24 and the lane change portion 32 are formed to extend on the opposite sides from each other. The lane change portions 24 and the lane change portions 32, which are included in the coil 1 of the final shape, are thus formed in the crank forming step.

(90° Bending Forming Step)

Figure 24:
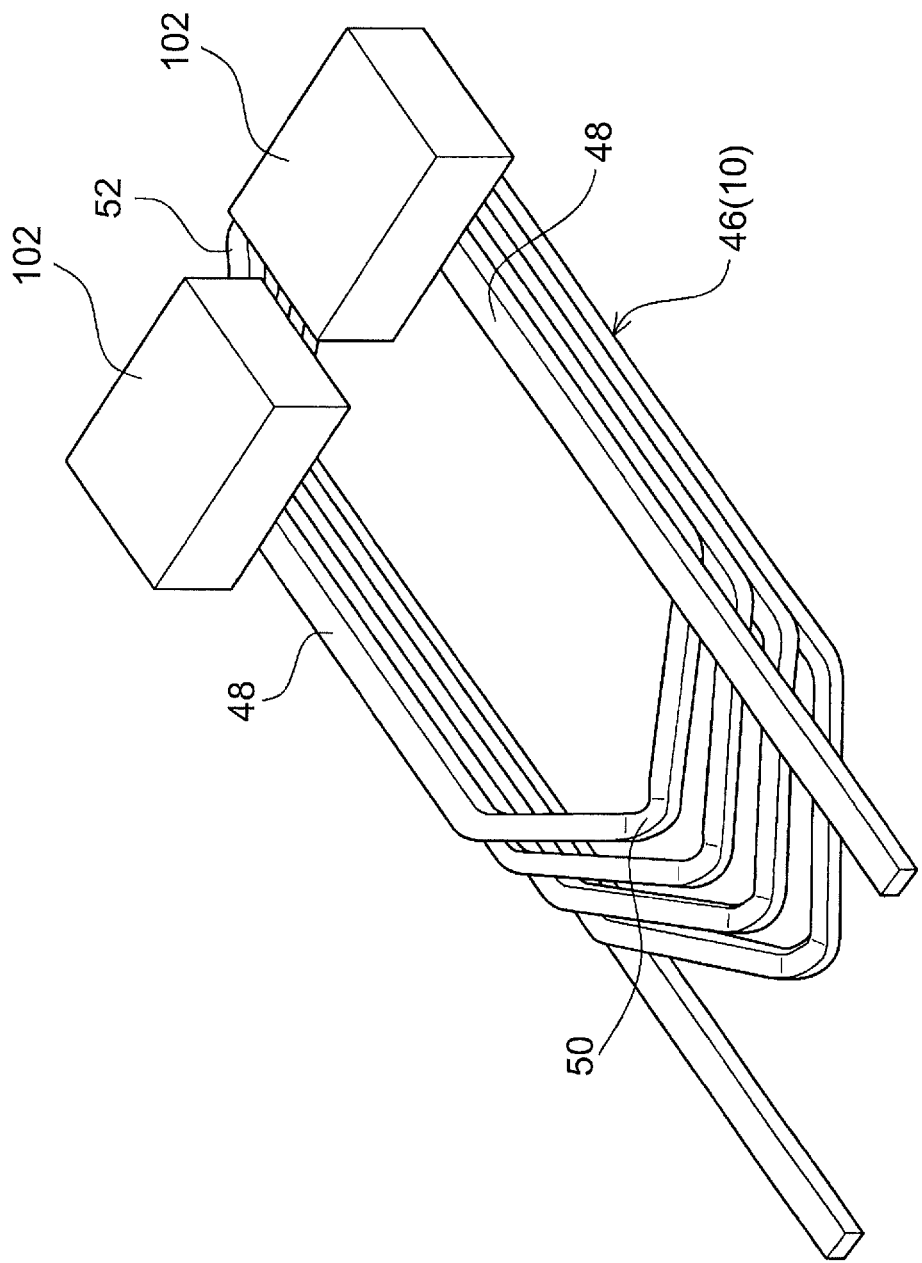
FIG. 24 is a perspective view showing the appearance of the forming dies and the winding before forming by a 90° bending forming step.
Figure 25:
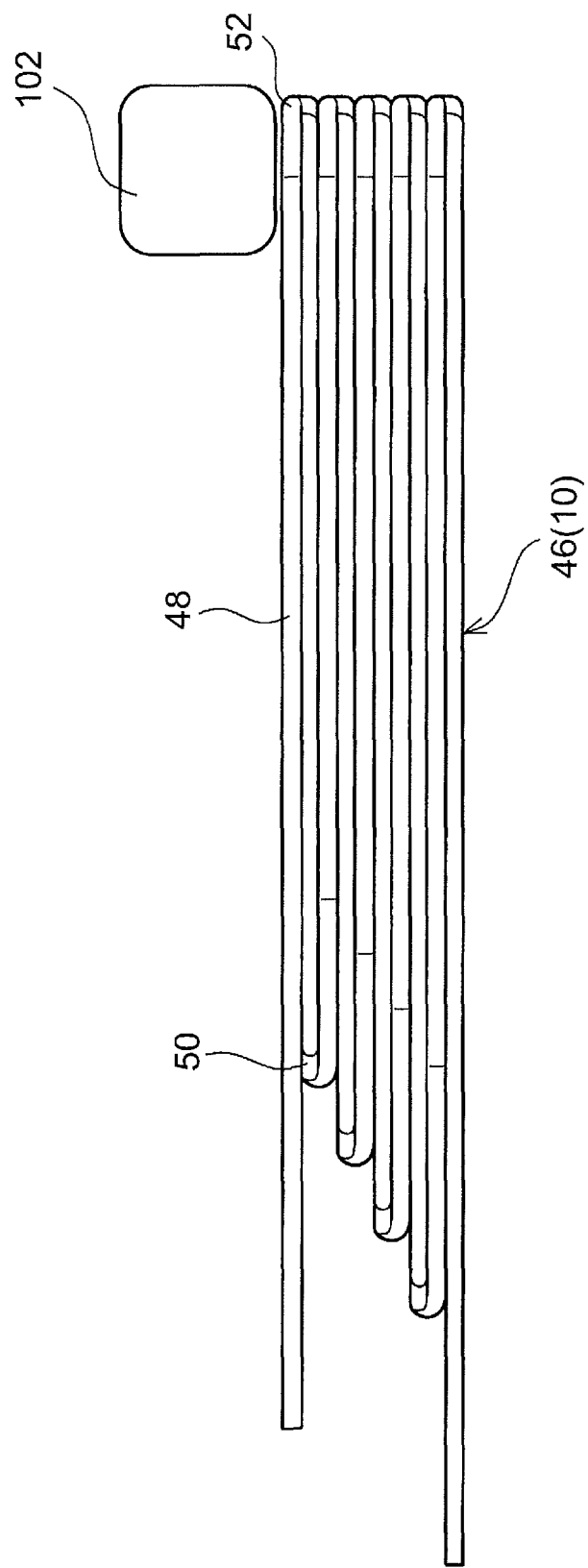
FIG. 25 is a side view of the forming dies and the winding before forming by the 90° bending forming step.
Figure 26:
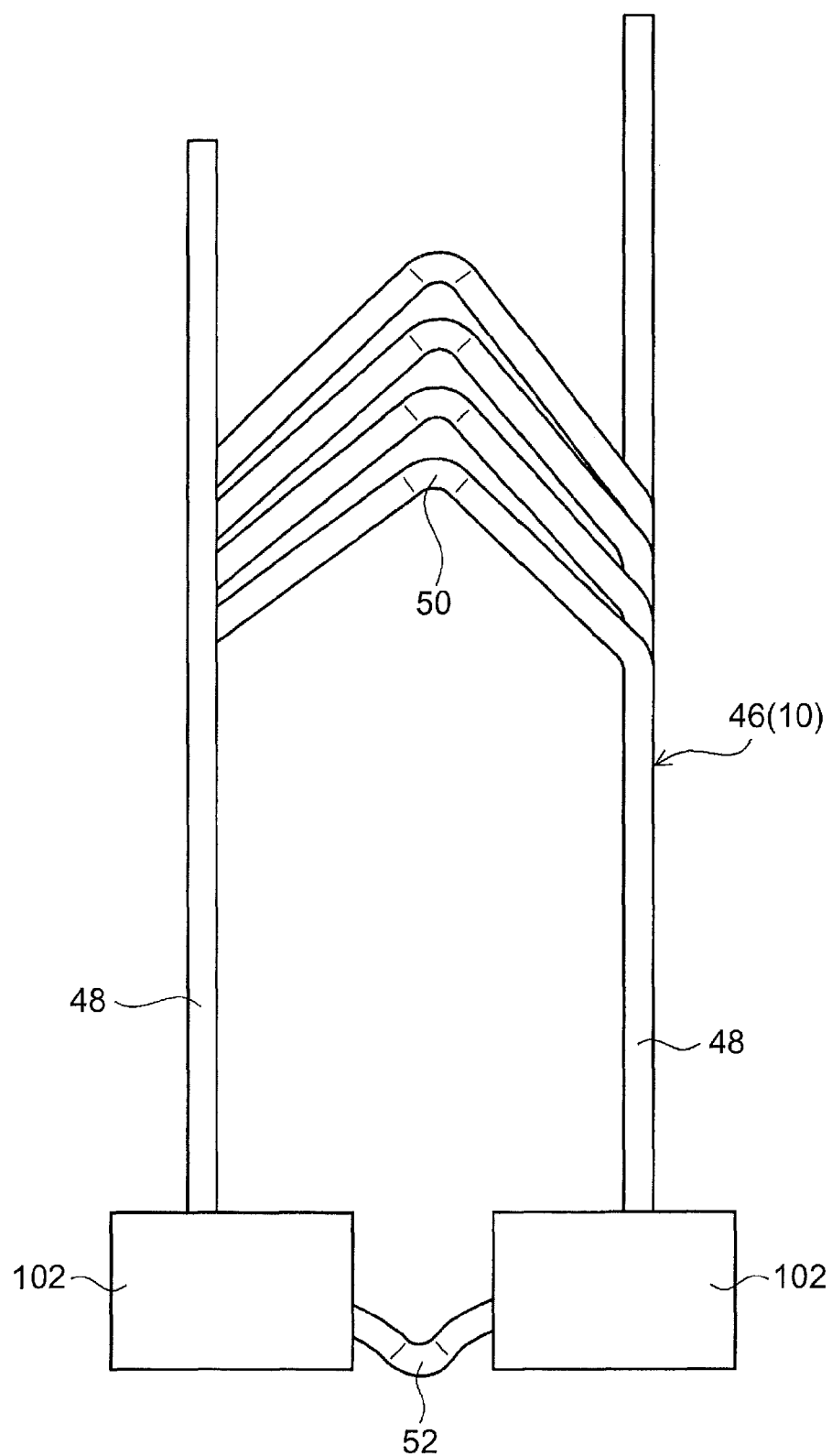
FIG. 26 is a top view of the forming dies and the winding before forming by the 90° bending forming step.

The 90° bending forming step will be described below. FIGS. 24 to 26 show the state before forming by the 90° bending forming step. FIG. 24 is a perspective view showing the appearance of forming dies and the winding, FIG. 25 is a side view of the forming dies and the winding, and FIG.

Figure 27:
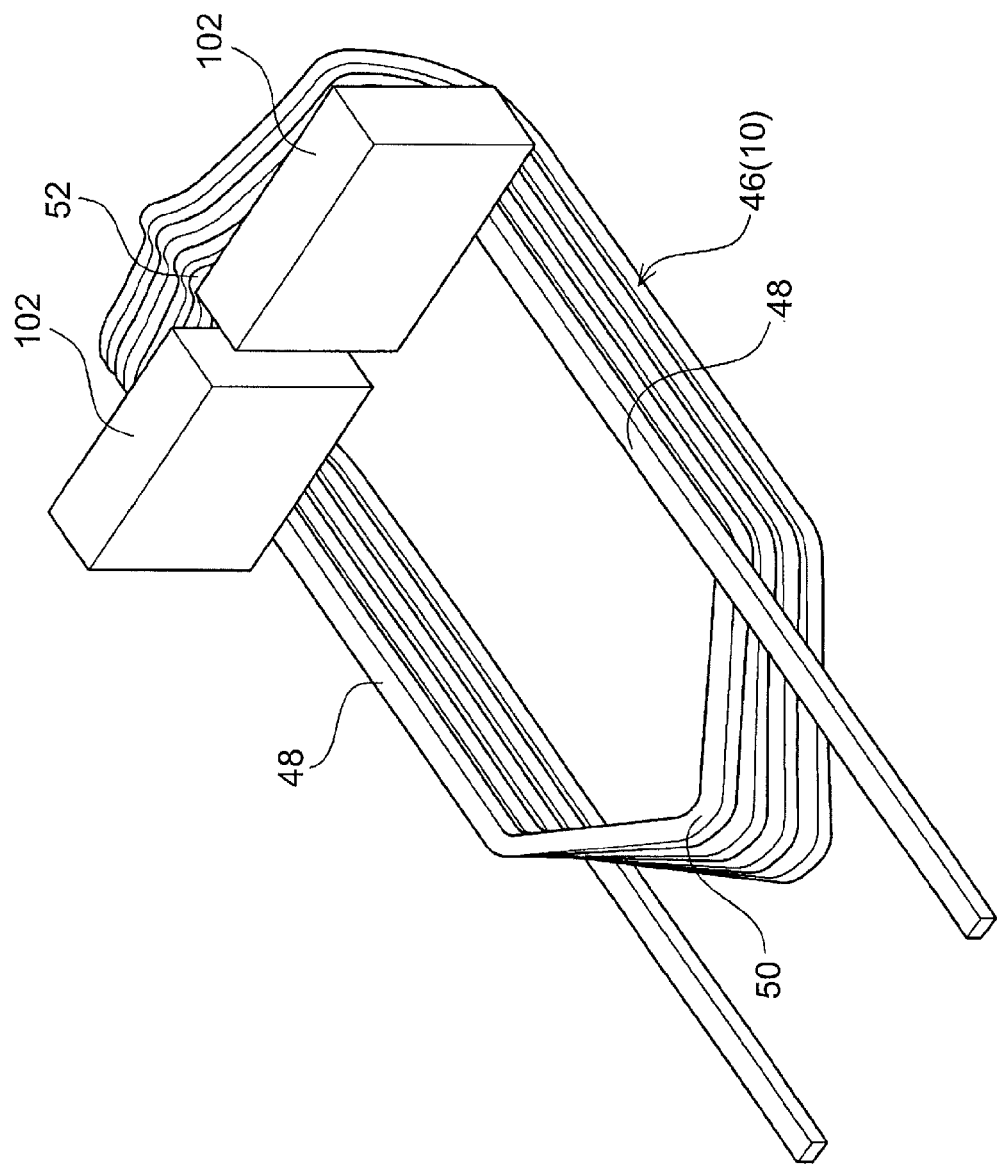
FIG. 27 is a perspective view showing the appearance of the forming dies and the winding after forming by the 90° bending forming step.
Figure 28:
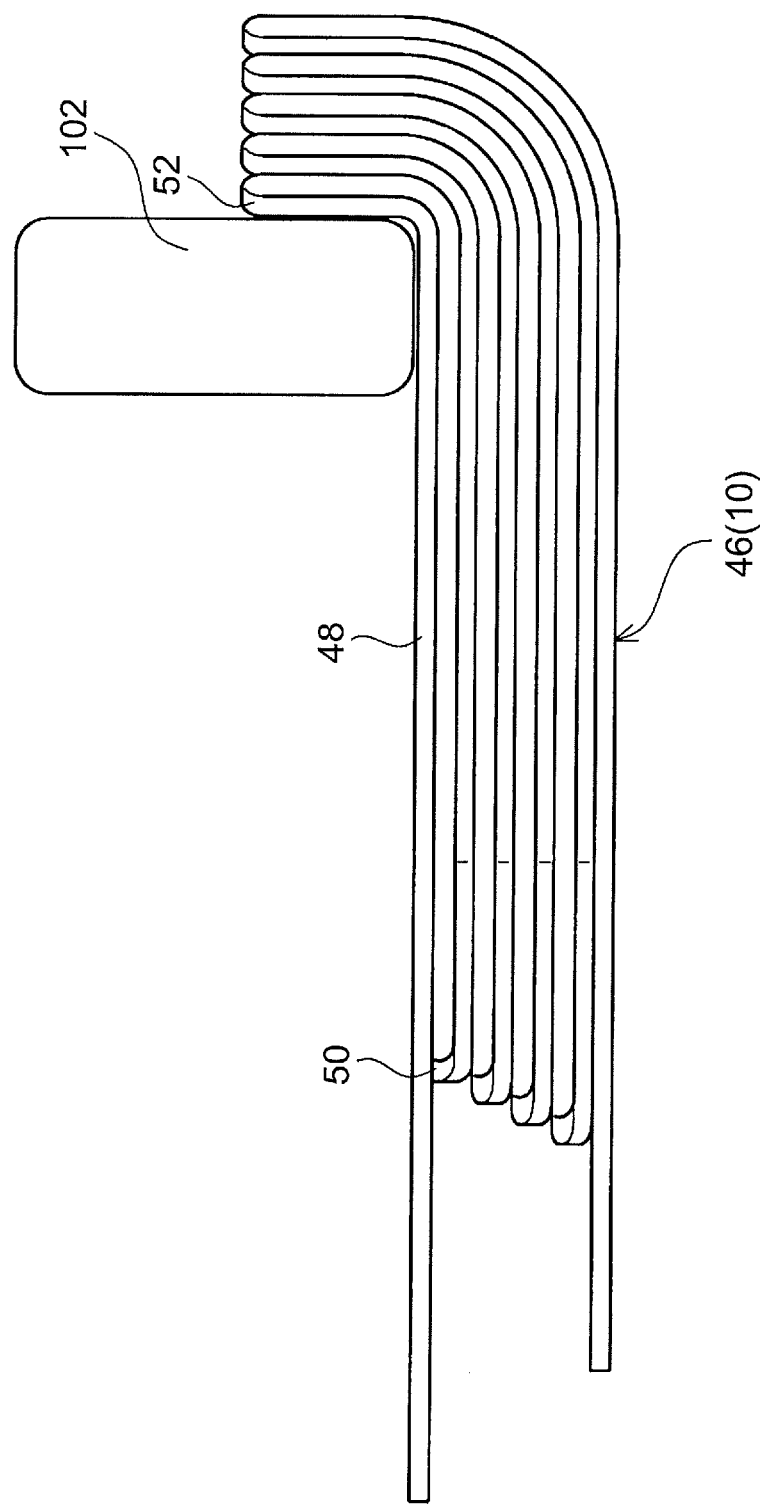
FIG. 28 is a side view of the forming dies and the winding after forming by the 90° bending forming step.
Figure 29:
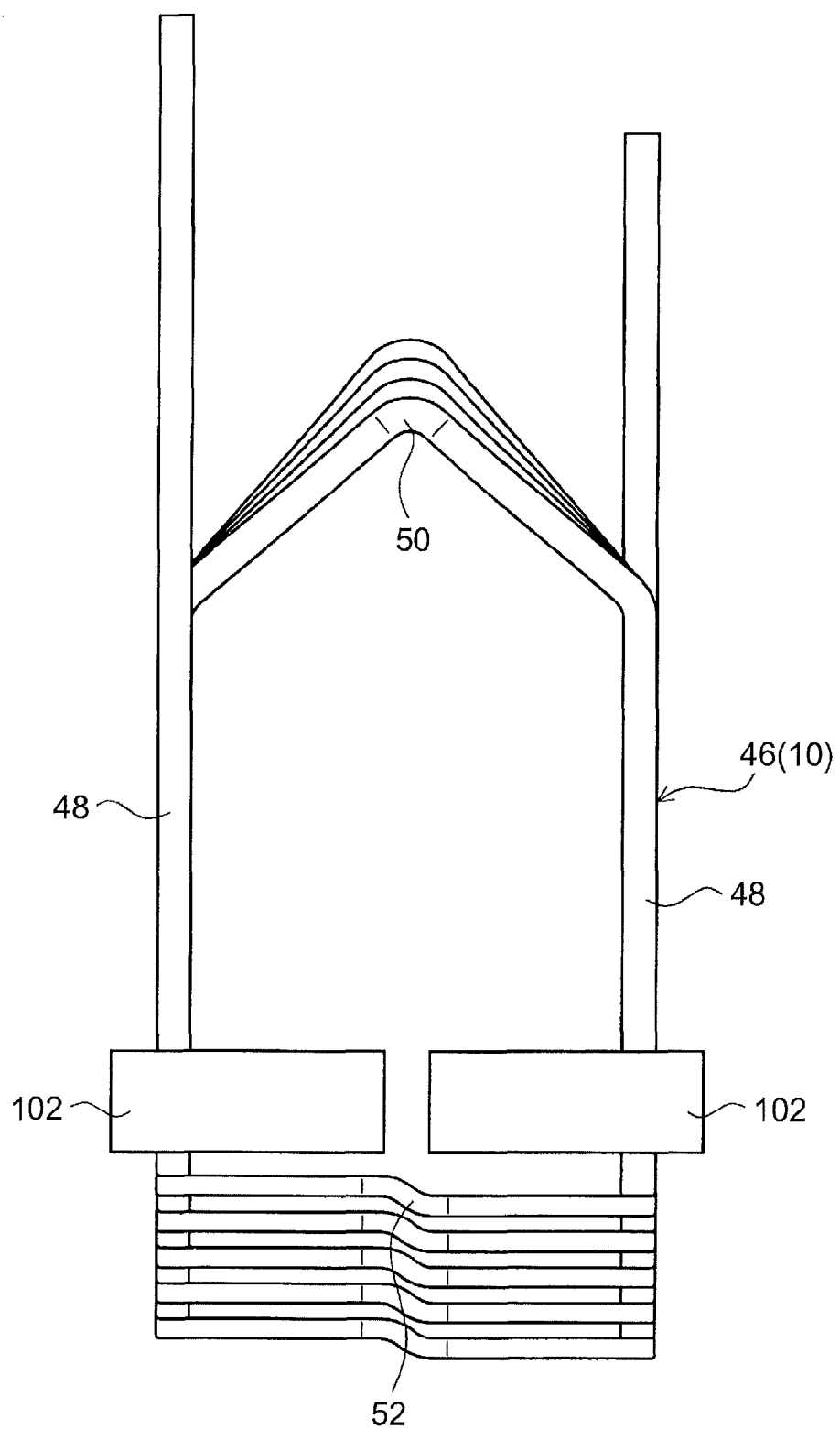
FIG. 29 is a top view of the forming dies and the winding after forming by the 90° bending forming step.
Figure 30:
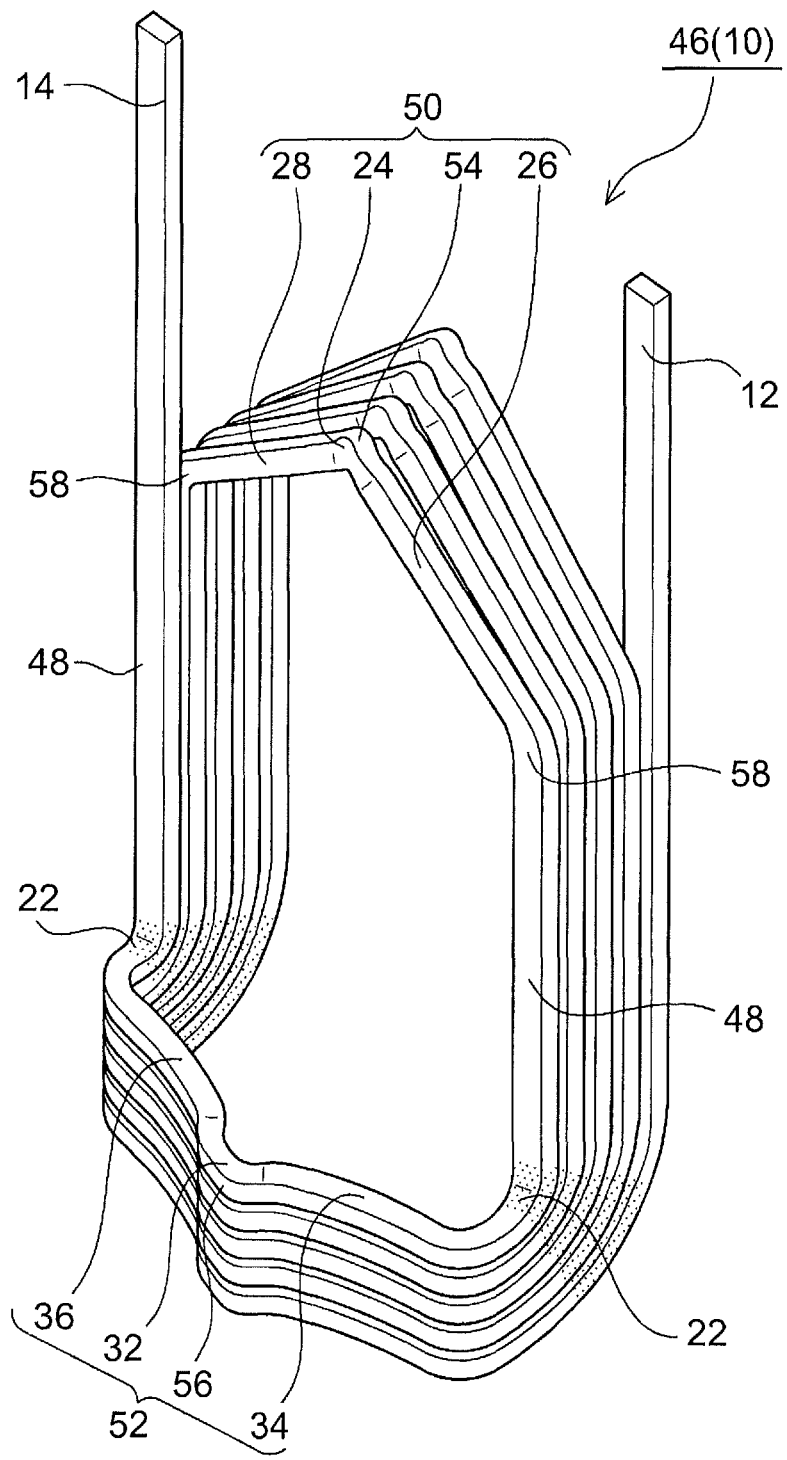
FIG. 30 is a perspective view showing the appearance of the winding after forming by the 90° bending forming step.
Figure 31:
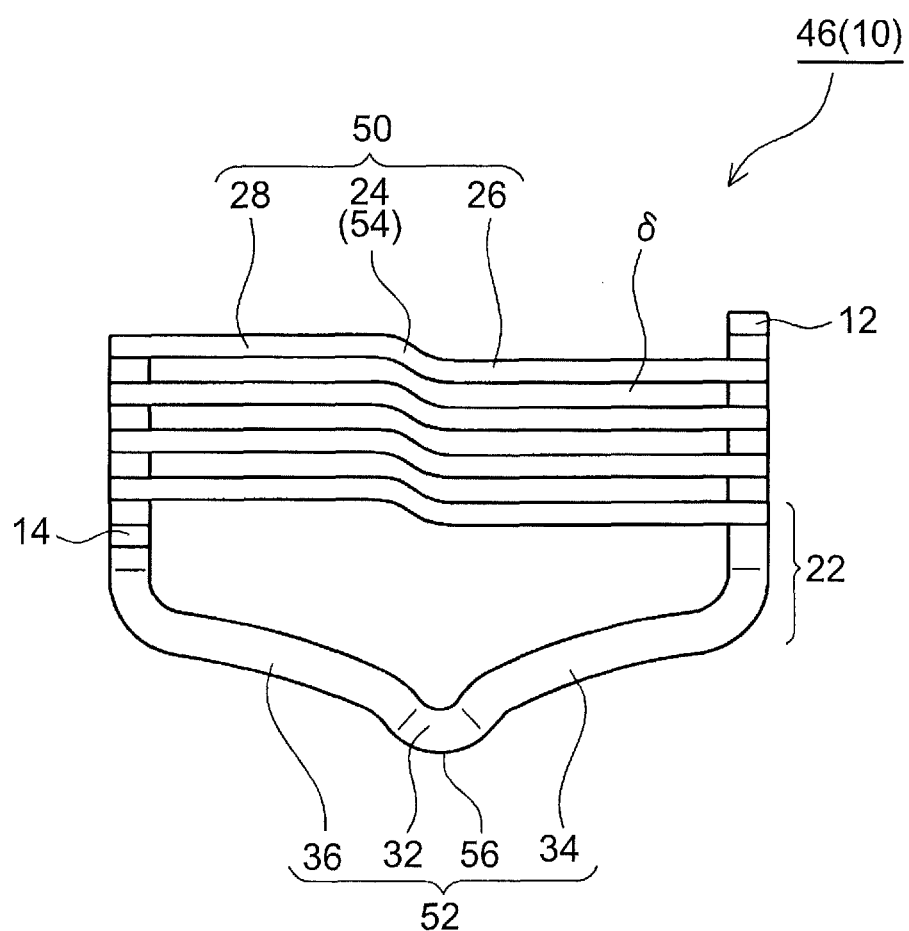
FIG. 31 is a top view of the winding after forming by the 90° bending forming step.

26 is a top view of the forming dies and the winding. FIGS. 27 to 29 show the state after forming by the 90° bending forming step. FIG. 27 is a perspective view showing the appearance of the forming dies and the winding, FIG. 28 is a side view of the forming dies and the winding, and FIG. 29 is a top view of the forming dies and the winding. FIGS. 30 and 31 show the state after forming by the 90° bending forming step. FIG. 30 is a perspective view showing the appearance of the winding, and FIG. 31 is a top view of the winding. The shaded part in FIG. 30 shows a portion in which the rectangular conductor 10 is deformed in the 90° bending forming step.

As shown in FIGS. 24 to 26, a pair of benders 102 are used in the 90° bending forming step. The benders 102 are placed on a part of the expected slot placement portion 48 and the expected opposite-side coil end placement portion 52 of the winding 46.

As shown in FIGS. 27 to 29, in the 90° bending forming step, 90° bending forming is performed from the state shown in FIGS. 24 to 26 by bending the expected opposite-side coil end placement portions 52 by 90° with respect to the expected slot placement portions 48.

The winding 46 is thus formed into the shape shown in FIGS. 30 and 31. As shown in FIGS. 30 and 31, in the winding 46 thus formed, the stacking direction of the loops of the rectangular conductor 10 in the expected lead-side coil end placement portions 50 is perpendicular to that of the loops of the rectangular conductor 10 in the expected opposite-side coil end placement portions 52. The positions of the top parts 54 of the expected lead-side coil end placement portions 50 in the radially outward direction of the winding 46 (the vertical direction in FIG. 30) are aligned with each other in the stacking direction of the loops of the rectangular conductor 10 (the direction perpendicular to the plane of the paper in FIG. 30 and away from the viewer, the vertical direction in FIG. 31).

Thus, the winding 46 is formed by the 90° bending forming step so that the stacking direction of the loops of the rectangular conductor 10 in the slot placement portion 16 and the lead-side coil end placement portion 18 is perpendicular to that of the loops of the rectangular conductor 10 in the opposite-side coil end placement portion 20 in the coil 1 of the final shape.

The positions of the top parts 56 of the expected opposite-side coil end placement portions 52 in the radially outward direction of the winding 46 (the vertical direction in FIG. 10) are aligned with each other in the stacking direction of the loops of the rectangular conductor 10 (the direction perpendicular to the plane of the paper in FIG. 10 and away from the viewer). The positions of the top parts 56 of the expected opposite-side coil end placement portions 52 are thus controlled to be aligned with each other throughout the winding step and the steps described below. This improves dimensional accuracy of the opposite-side coil end placement portions 20 in the coil 1 of the final shape. Accordingly, the opposite-side coil end placement portions 20 can accurately gather radially inward of the stator core 132, and reduction in size of the coil end portion can be achieved.

(Opening/Arc Forming Step)

The opening/arc forming step will be described below. The opening/arc forming step is a step of simultaneously performing an opening step and an arc forming step.

Figure 32:
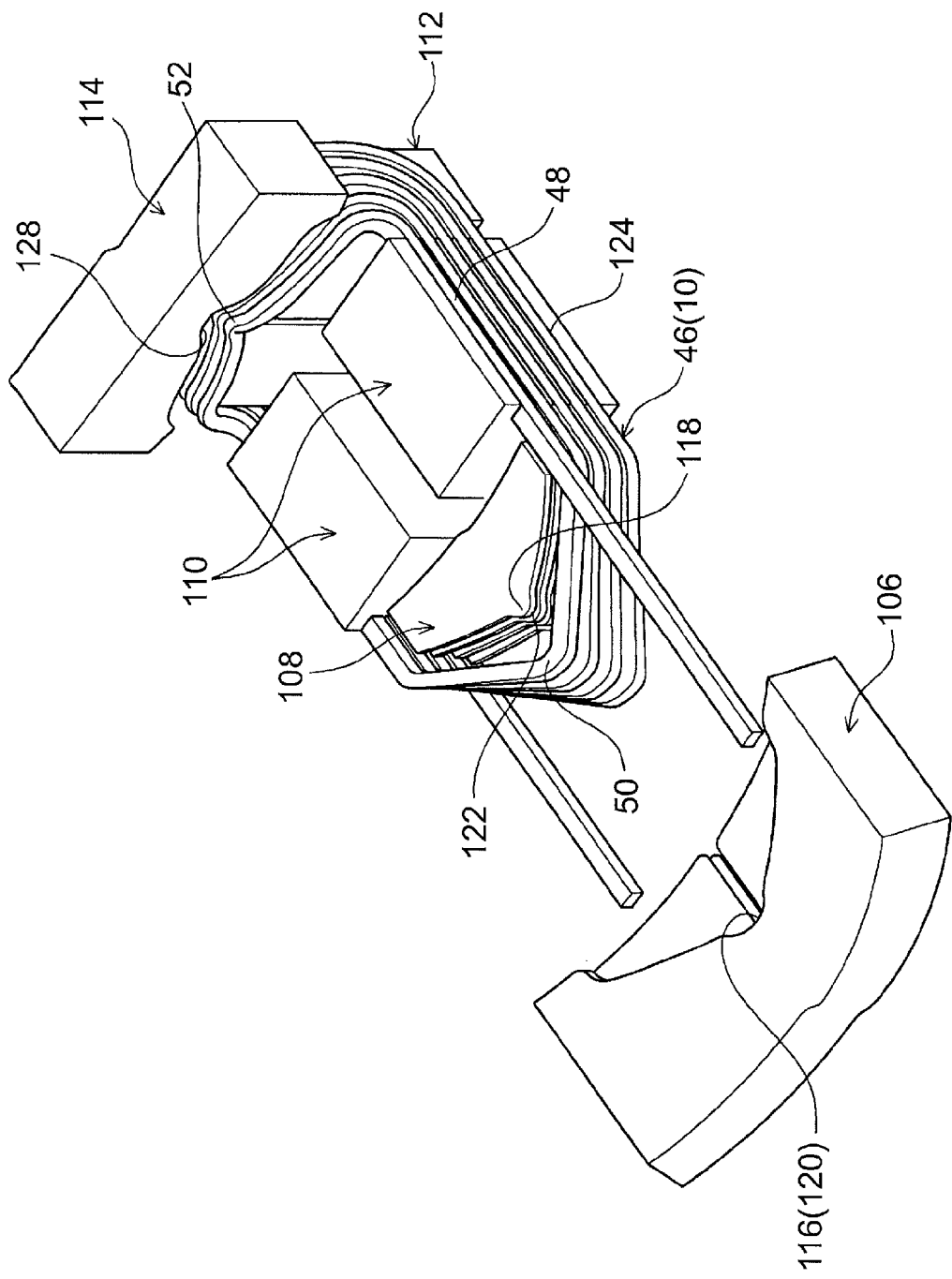
FIG. 32 is a perspective view showing the appearance of the forming dies and the winding before forming by an opening/arc forming step.
Figure 33:
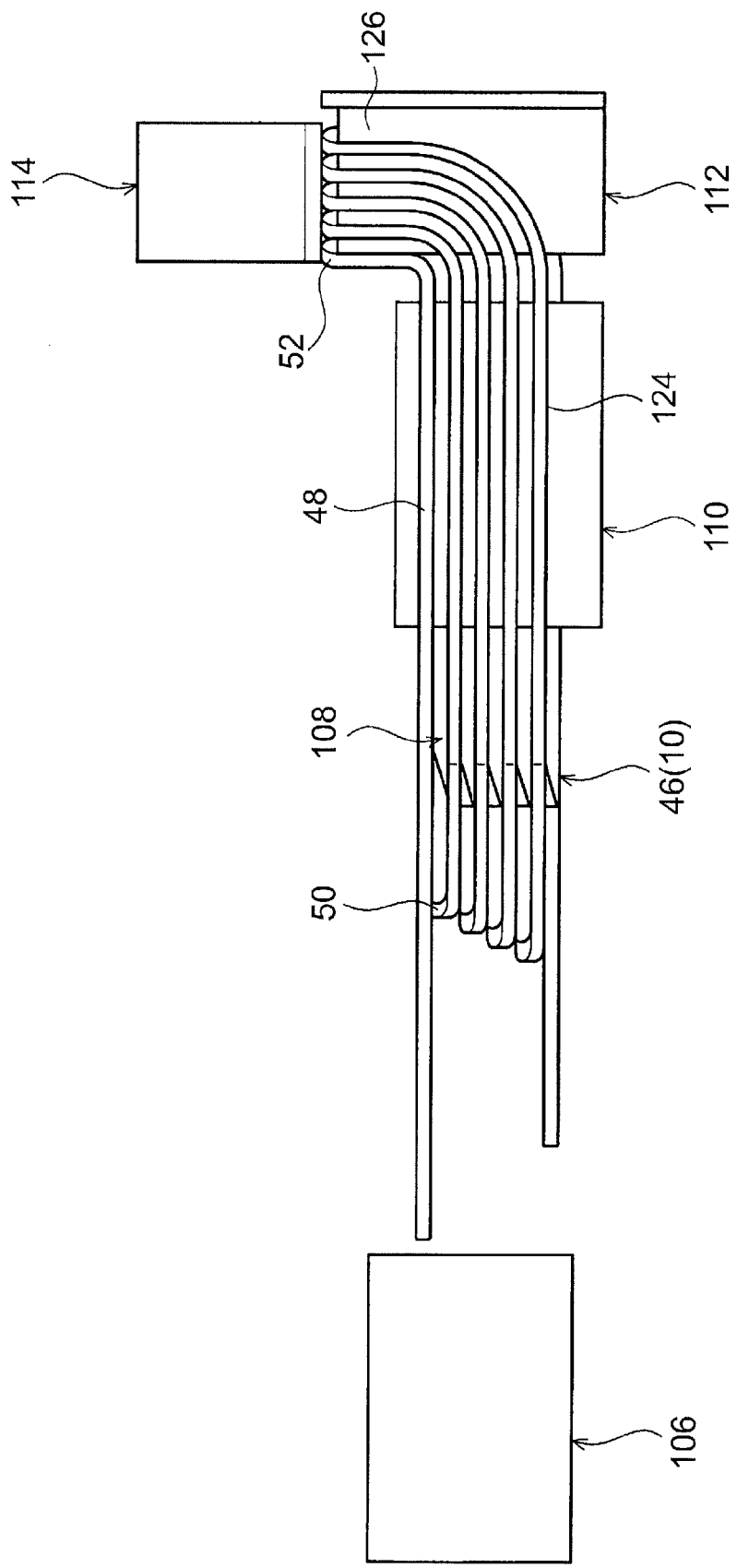
FIG. 33 is a side view of the forming dies and the winding before forming by the opening/arc forming step.
Figure 34:
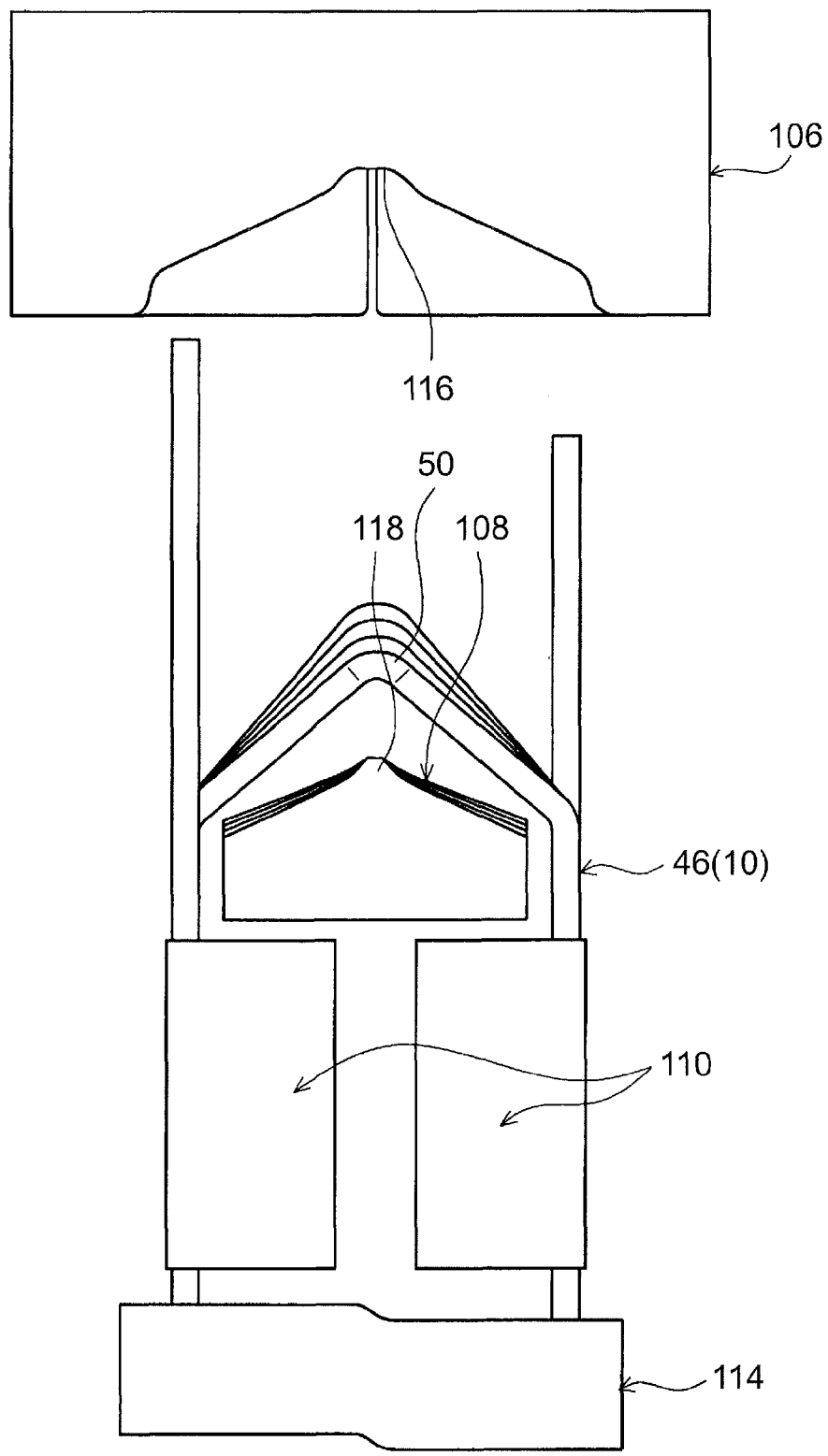
FIG. 34 is a top view of the forming dies and the winding before forming by the opening/arc forming step.
Figure 35:
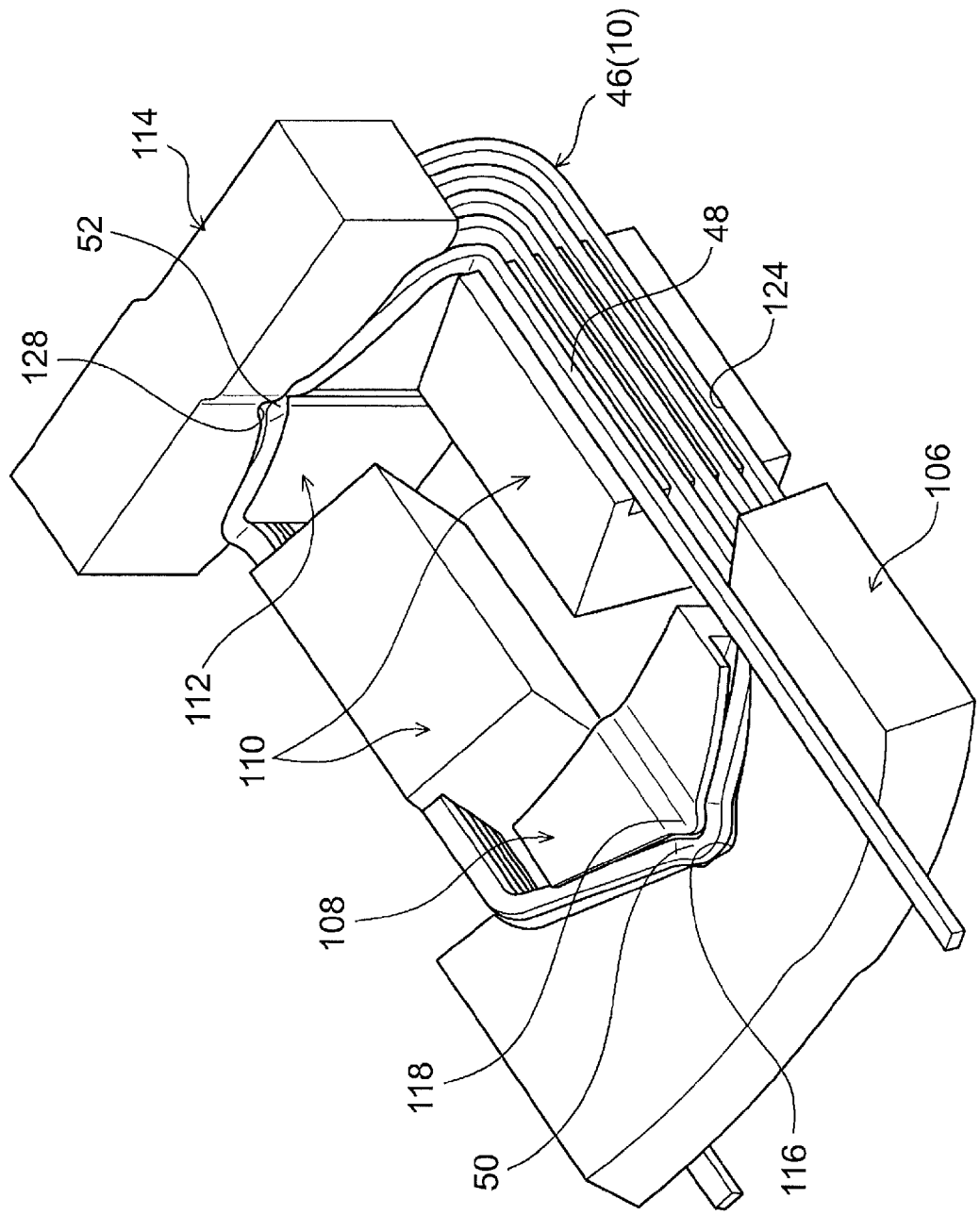
FIG. 35 is a perspective view showing the appearance of the forming dies and the winding after forming by the opening/arc forming step.
Figure 36:
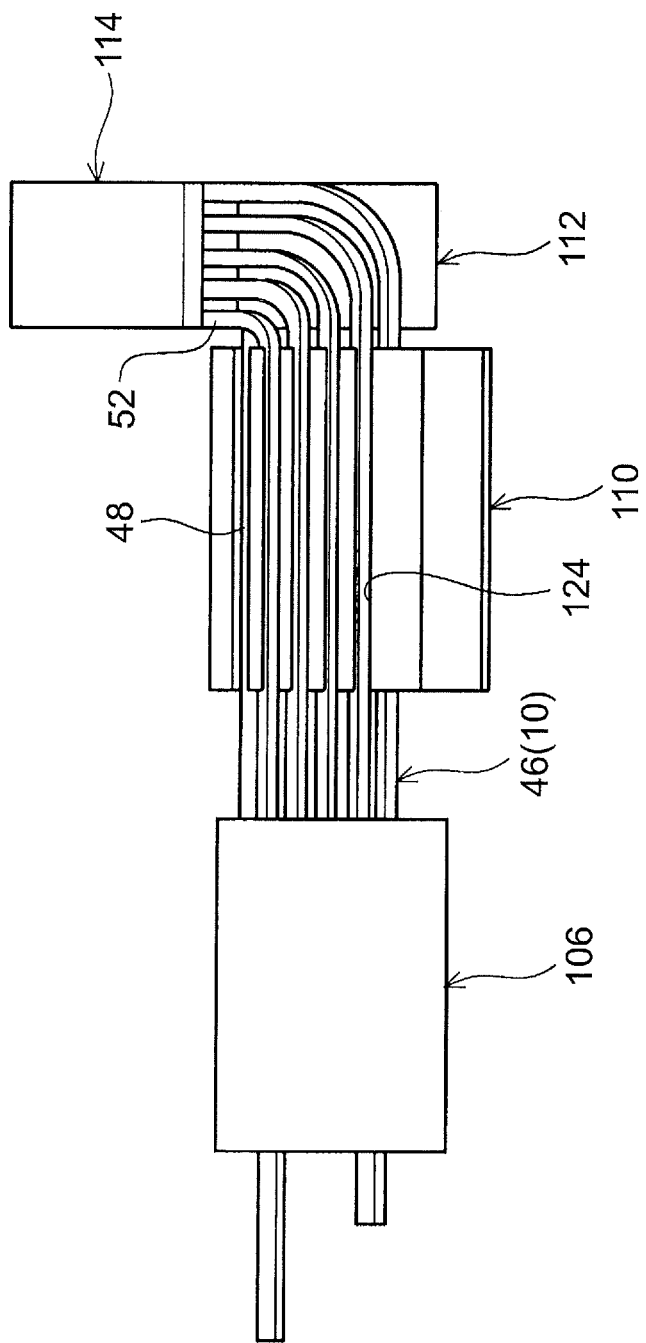
FIG. 36 is a side view of the forming dies and the winding after forming by the opening/arc forming step.
Figure 37:
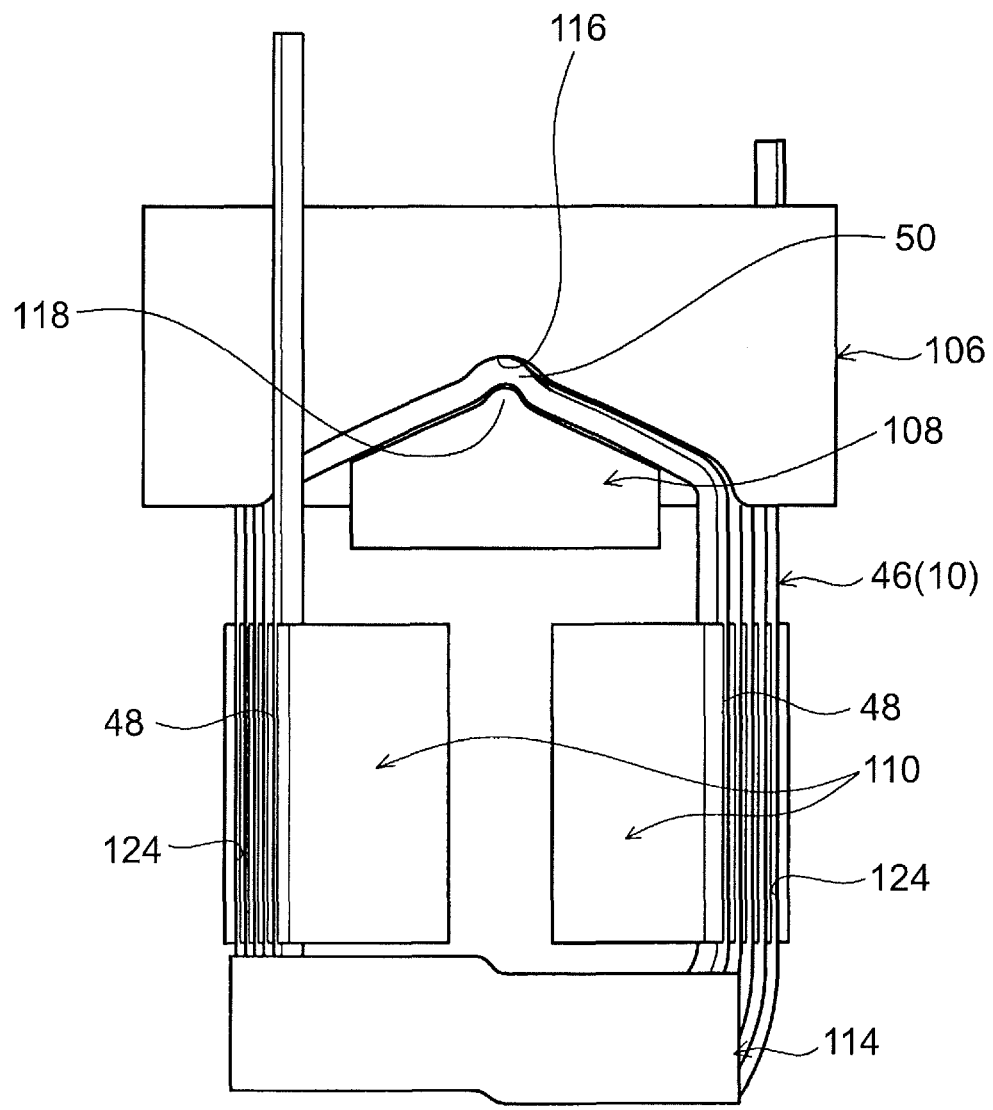
FIG. 37 is a top view of the forming dies and the winding after forming by the opening/arc forming step.

FIGS. 32 to 34 show the state before forming by the opening/arc forming step. FIG. 32 is a perspective view showing the appearance of forming dies and the winding, FIG. 33 is a side view of the forming dies and the winding, and FIG. 34 is a top view of the forming dies and the winding. FIGS. 35 to 37 show the state after forming by the opening step and the arc forming step. FIG. 35 is a perspective view showing the appearance of the forming dies and the winding, FIG. 36 is a side view of the forming dies and the winding, and FIG. 37 is a top view of the forming dies and the winding.

As shown in FIGS. 32 to 34, a first opening/arc forming die 106, a second opening/arc forming die 108, a pair of third opening/arc forming dies 110, a fourth opening/arc forming die 112, and a fifth opening/arc forming die 114 are used in the opening/arc forming step. The first opening/arc forming die 106 has a recessed portion 116 that can be fitted on a protruding portion 118 of the second opening/arc forming die 108 described below. In the present embodiment, the first opening/arc forming die 106 has four recessed portions 116 by way of example. The second opening/arc forming die 108 has the protruding portion 118 that can be fitted in the recessed portion 116 of the first opening/arc forming die 106. In the present embodiment, the second opening/arc forming die 108 has four protruding portions 118 by way of example. The third opening/arc forming die 110 has a groove 124. In the present embodiment, the third opening/arc forming die 110 has five grooves 124 by way of example. The fourth opening/arc forming die 112 has a protruding portion 126 that can be fitted in a recessed portion 128 of the fifth opening/arc forming die 114 described below. The fifth opening/arc forming die 114 has the recessed portion 128 that can be fitted on the protruding portion 126 of the fourth opening/arc forming die 112.

In the opening/arc forming step, as shown in FIGS. 32 to 34, the expected slot placement portions 48 are first placed in the grooves 124 of the third opening/arc forming dies 110. As shown in FIGS. 35 to 37, the expected lead-side coil end placement portions 50 are sandwiched between the first opening/arc forming die 106 and the second opening/arc forming die 108, and the first opening/arc forming die 106 and the second opening/arc forming die 108 are fitted on each other. The expected opposite-side coil end placement portions 52 are sandwiched between the fourth opening/arc forming die 112 and the fifth opening/arc forming die 114, and the fourth opening/arc forming die 112 and the fifth opening/arc forming die 114 are fitted on each other. Moreover, the pair of third opening/arc forming dies 110 are rotated in the opposite directions to each other by a predetermined amount.

The opening is thus performed so that the interval between each pair of expected slot placement portions 48 on the circumference of the winding 46 gradually increases in the stacking direction of the loops of the rectangular conductor 10. That is, as shown in FIG. 3, the winding 46 is formed so that intervals L1 to L5 between each pair of slot placement portions 16 on the circumference of the coil 1 gradually increases in the stacking direction of the loops of the rectangular conductor 10 (the upward direction in FIG. 3) in order of the intervals L1, L2, L3, L4, and L5. The slot placement portions 16 can thus be reliably placed in the slots 136 (see FIG. 44) formed in a radial pattern in the radial direction of the stator core 132 (see FIG. 44).

At the same time, arc forming is performed in which the first edges 26 and the second edges 28 of the expected lead-side coil end placement portions 50 are formed into an arc shape curved in the stacking direction of the loops of the rectangular conductor 10. As shown in FIG. 3, the first edges 26 and the second edges 28 of the lead-side coil end placement portions 18 are thus formed into an arc shape curved in the stacking direction of the loops of the rectangular conductor 10 (the upper direction in FIG. 3). Since the first edges 26 and the second edges 28 are formed into the arc shape, the lead-side coil end placement portions 18 can be placed along the circumferential direction of the stator core 132 (see FIG. 44).

The coil 1 shown in FIGS. 1 to 3 can be manufactured in this manner.

[Manufacturing Method of Stator]

Figure 40:
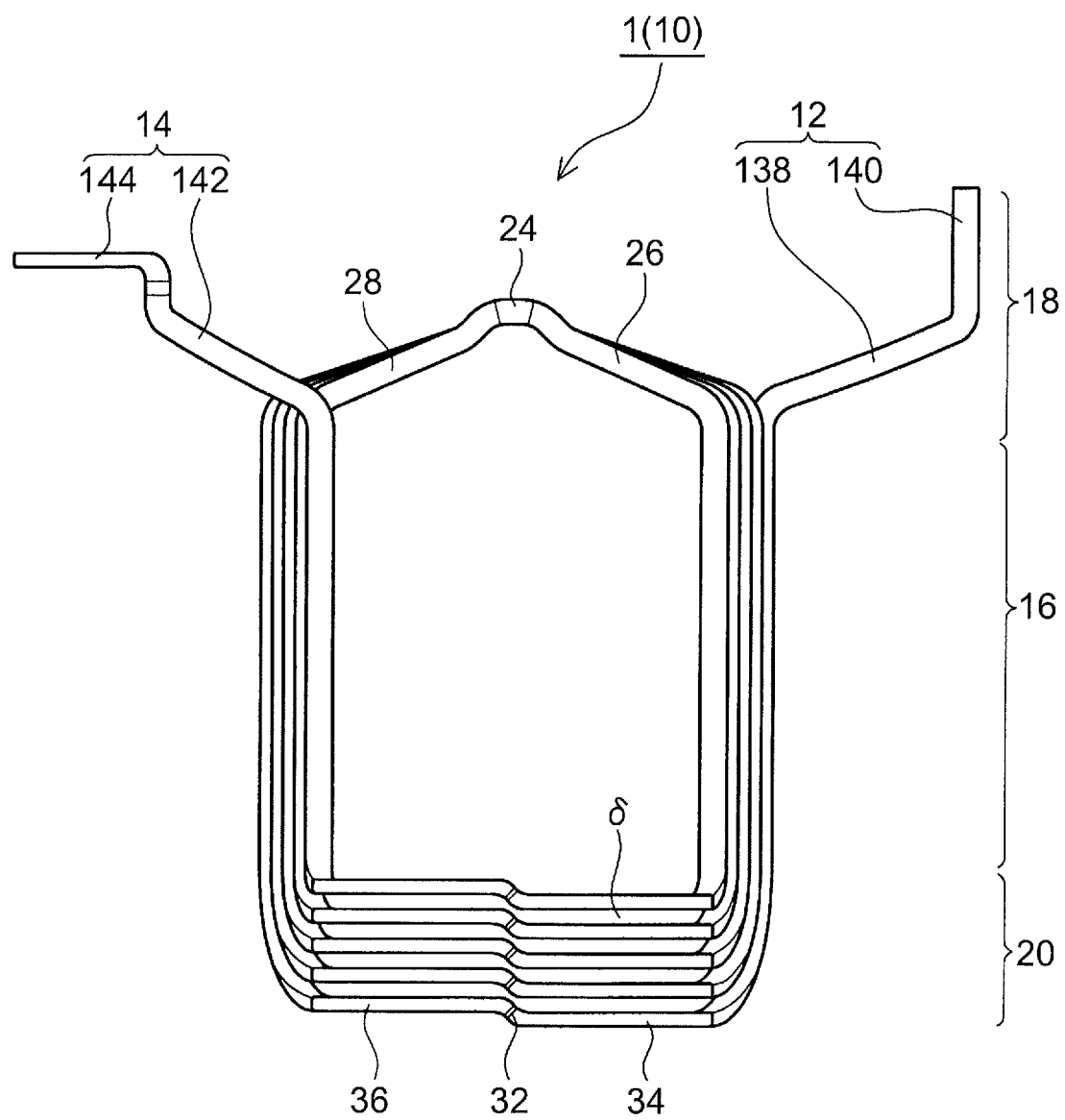
FIG. 40 is a front view of the coil that has been additionally processed in order to place the coil in a stator core.
Figure 41:
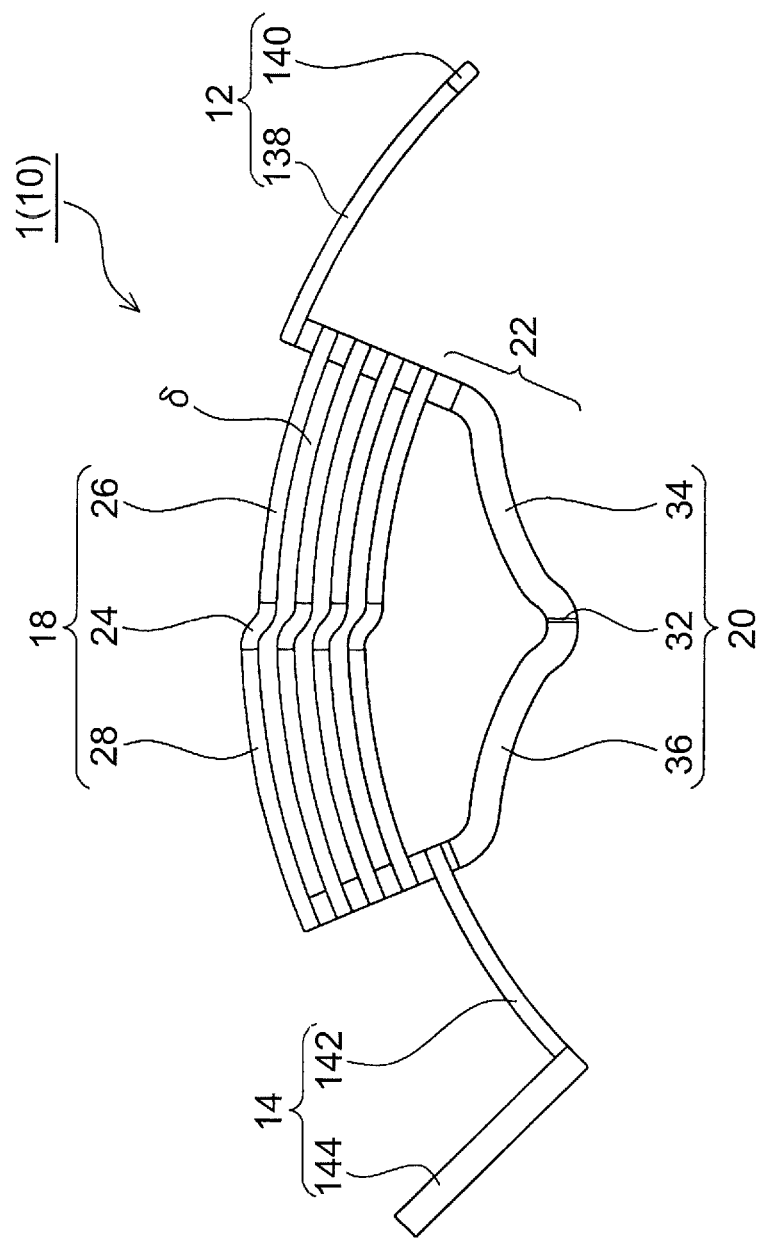
FIG. 41 is a top view of the coil that has been additionally processed in order to place the coil in the stator core.
Figure 42:
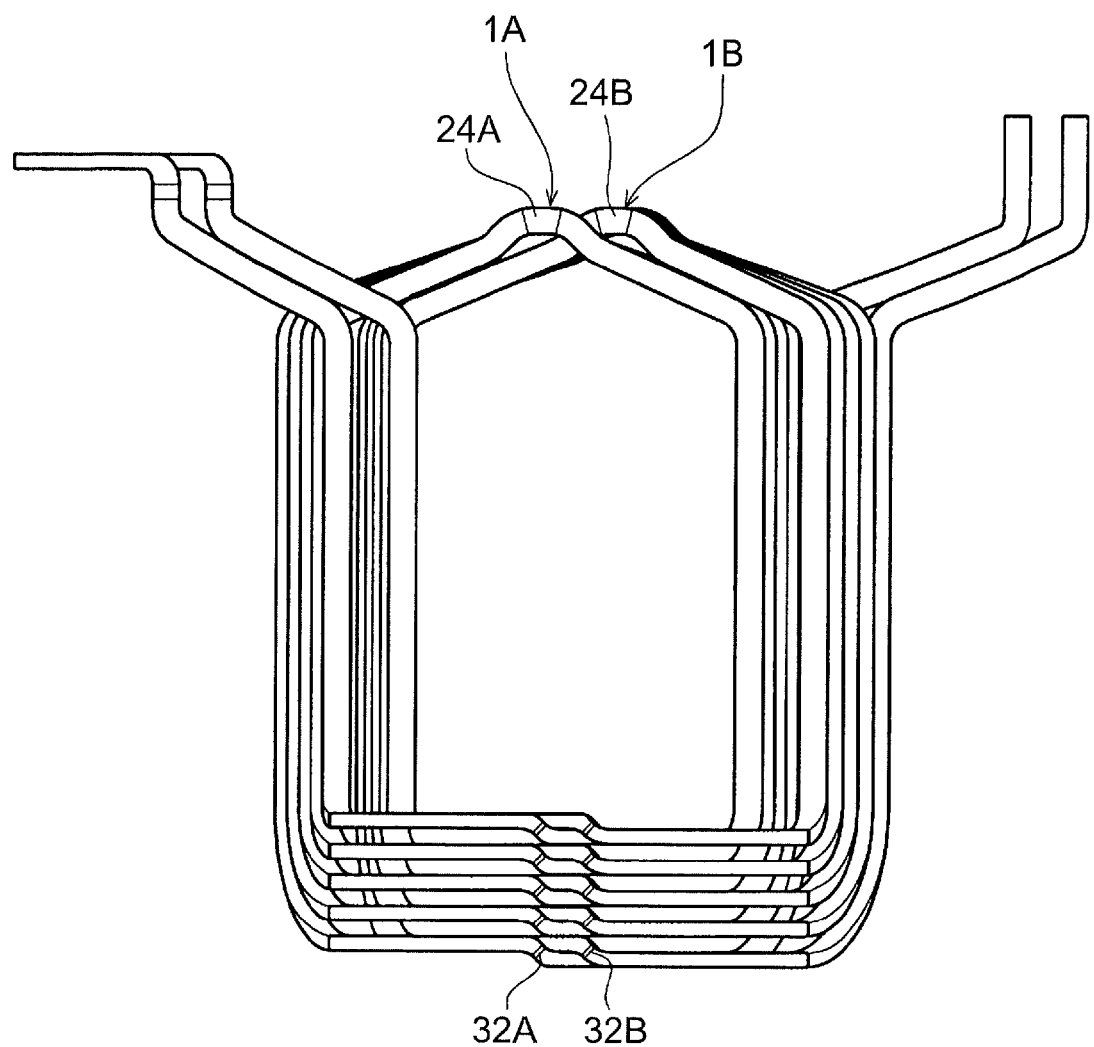
FIG. 42 is a front view showing adjoining two coils in a coil basket.
Figure 43:
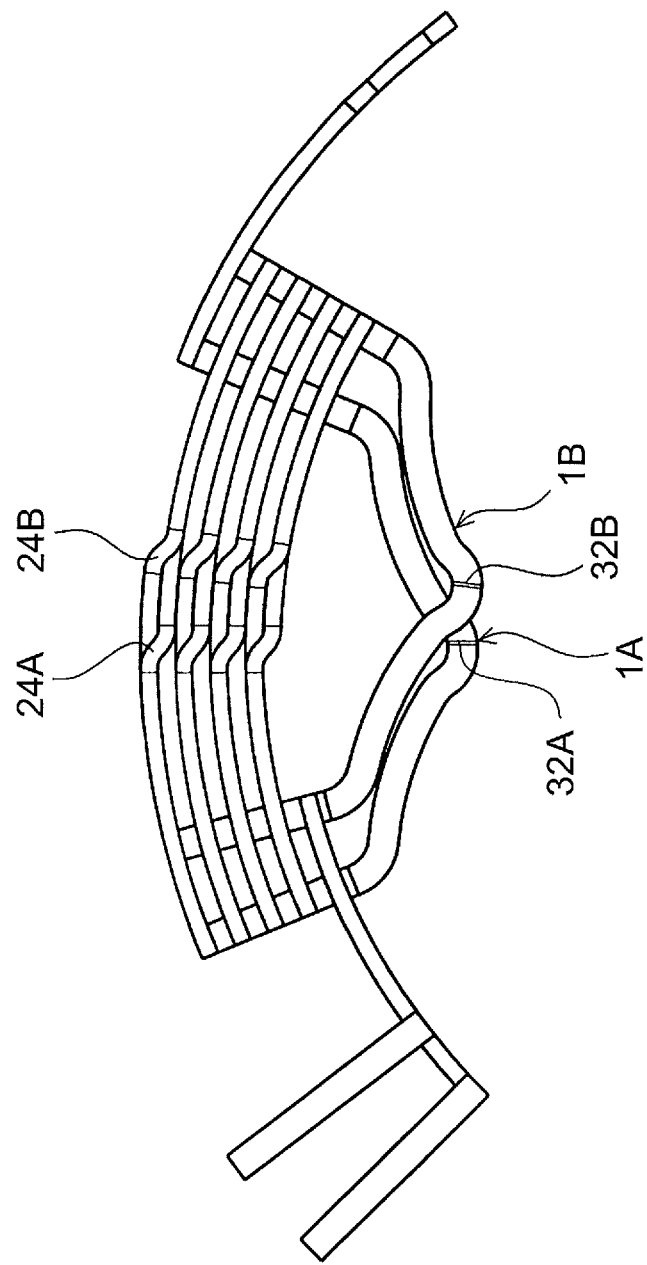
FIG. 43 is a top view showing the adjoining two coils in the coil basket.
Figure 45:
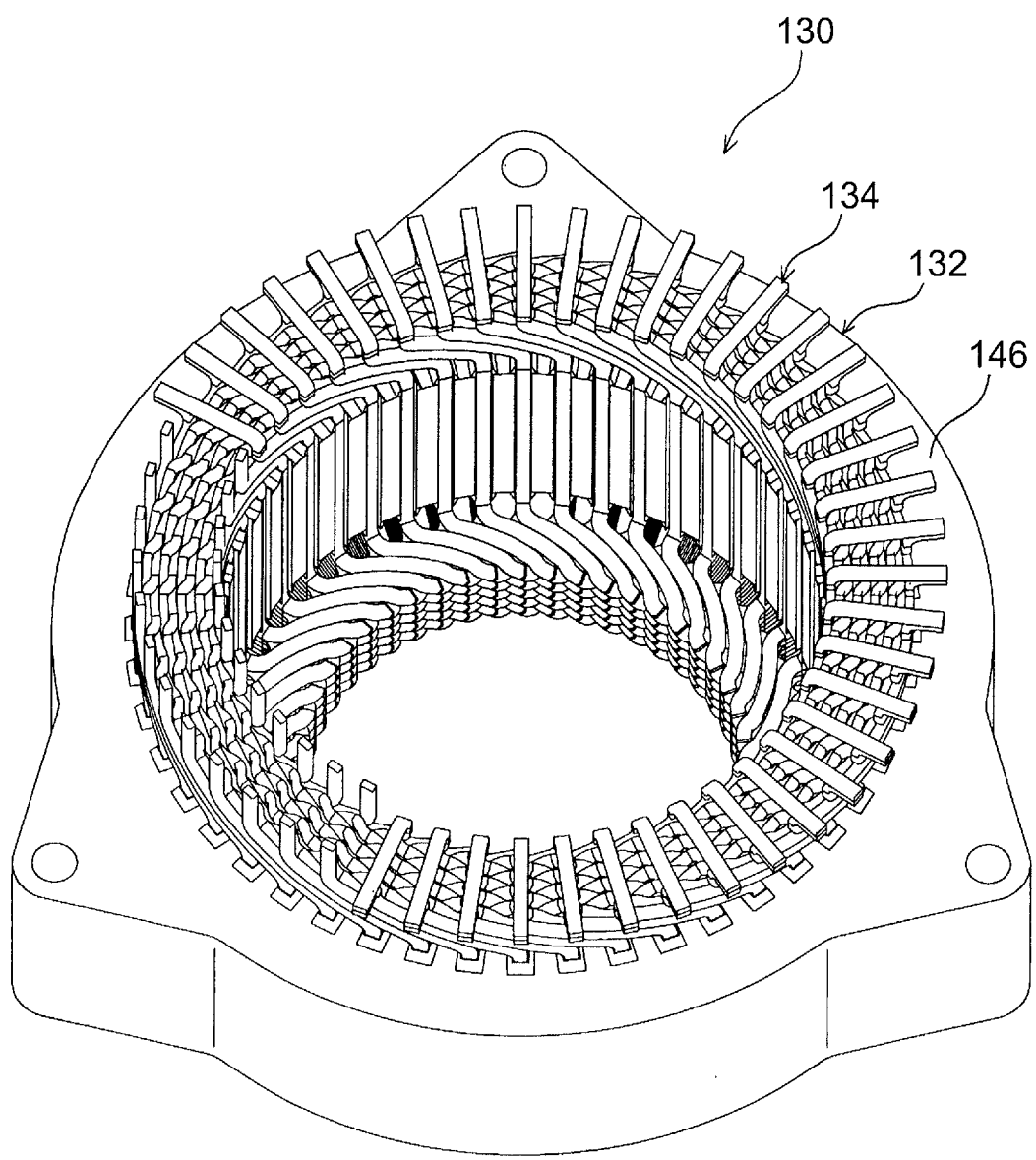
FIG. 45 is a perspective view of a stator.

A method for manufacturing the stator 130 using the coil 1 manufactured as described above will be described below. FIG. 40 is a front view of the coil 1 that has been additionally processed in order to place the coil 1 in the stator core 132, and FIG. 41 is a top view of the coil 1 that has been additionally processed in order to place the coil 1 in the stator core 132. FIG. 42 is a front view showing adjoining two coils 1A, 1B in the coil basket 134, and FIG. 43 is a top view showing the adjoining two coils 1A, 1B in the coil basket 134. FIG. 44 is a perspective view showing the state where a part of the coil basket 134 is inserted into the stator core 132, and FIG. 45 is a perspective view of the stator 130.

First, the coil 1 is additionally processed in order to place the coil 1 in the stator core 132. The coil 1 is thus formed into the shape shown in FIGS. 40 and 41. Specifically, the coil 1 is formed so that one end 12 of the coil 1 has a bridge portion 138 and a lead portion 140 and the other end 14 of the coil 1 has a bridge portion 142 and a joint portion 144. Then, a plurality of the coils 1 thus formed are placed on each other to form the coil basket 134. Thereafter, as shown in FIG. 44, the coil basket 134 is inserted into the stator core 132 along the axial direction of the stator core 132 so as to be placed into the slots 136. The stator 130 as shown in FIG. 45 is manufactured in this manner.

FIGS. 42 and 43 are views showing adjoining two coils 1A, 1B in the coil basket 134. As shown in FIGS. 42 and 43, the two coils 1A, 1B are meshed with each other such that each loop of the rectangular conductor 10 of one coil is fitted in each clearance δ of the other coil. Lead-side lane change portions 24A, 24B are placed so as to adjoin each other, and opposite-side lane change portions 32A, 32B are placed so as to adjoin each other. The lane change portions 24A, 24B and the lane change portions 32A, 32B are provided so that each loop of the rectangular conductor 10 of one coil bypasses a single loop of the rectangular conductor 10 of the other coil.

Effects of Embodiment

According to the above embodiment, the coil 1 can be manufactured in which the clearance δ is provided between adjoining loops of the rectangular conductor 10, and the lane change portions 24, 32 each formed by a stepped portion having a size corresponding to the length of the shorter side of the rectangular section of the rectangular conductor 10 are provided in the lead-side coil end placement portions 18 and the opposite-side coil end placement portions 20, respectively. This can reduce the size of the coil end of the stator 130. That is, when manufacturing the stator 130 using the coil 1 manufactured according to the present embodiment, each loop of the rectangular conductor 10 of the other coil 1B of the adjoining two coils 1A, 1B can be inserted in the clearance δ between adjoining loops of the rectangular conductor 10 in one coil 1A. Accordingly, the loops of the rectangular conductor 10 of the coil 1A and the loops of the rectangular conductor 10 of the coil 1B can be alternately arranged. Moreover, each loop of the rectangular conductor 10 of one coil 1A can bypass a single loop of the rectangular conductor 10 of the other coil 1B, at the lane change portions 24, 32 provided in the lead-side coil end placement portions 18 and the opposite-side coil end placement portions 20, respectively. Accordingly, each loop of the rectangular conductor 10 of the coil needs not to bypass, at the lane change portions thereof, a plurality of loops of the conductor as in the related art, and the lane change portions corresponding to the width of the plurality of loops of the conductor need not to be provided to extend in the axial direction of the stator core 132. This can reduce the height in the axial direction of the coil end of the stator 130. As described above, according to the present embodiment, the coil 1 capable of reducing the size of the coil end of the stator 130 can be manufactured. Moreover, since the stator 130 can be manufactured using a plurality of coils 1 having the same shape, assembly capability of the stator 130 is improved.

The manufacturing method includes the 90° bending forming step of bending and forming the winding 46 so that the stacking direction of the loops of the rectangular conductor 10 in the expected lead-side coil end placement portions 50 becomes perpendicular to the stacking direction of the loops of the rectangular conductor 10 in the expected opposite-side coil end placement portions 52. The coil 1 can therefore be inserted along the axial direction of the stator core 132 when placing the coil 1 into the stator core 132. Accordingly, as shown in FIG. 44, the coil basket 134 is formed by a plurality of coils 1, and then the coil basket 134 can be inserted into the stator core 132 along the axial direction of the stator core 132. This can simplify the manufacturing process of the stator 130.

The 90° bending forming step is performed before the opening step. This can prevent deformation of the expected opposite-side coil end placement portions 52 which is caused by performing the opening step before the 90° bending forming step. Accordingly, the expected opposite-side coil end placement portions 52 can be formed into a desired shape.

When the opening step and the arc forming step are performed simultaneously, the number of steps can be reduced, and the manufacturing time of the coil 1 can be reduced.

[Modifications]

The order of the above steps may be changed. For example, as a modification, the order of the protrusion forming step and the crank forming step may be switched from that of the embodiment, and the steps may be performed in order of the winding step, the crank forming step, the protrusion forming step, the 90° bending forming step, and the opening/arc forming step. Regarding this modification, FIG. 38 shows a perspective view of the appearance of the winding 46 after forming by the crank forming step, and FIG. 39 shows a top view of this winding 46.

Figure 38:
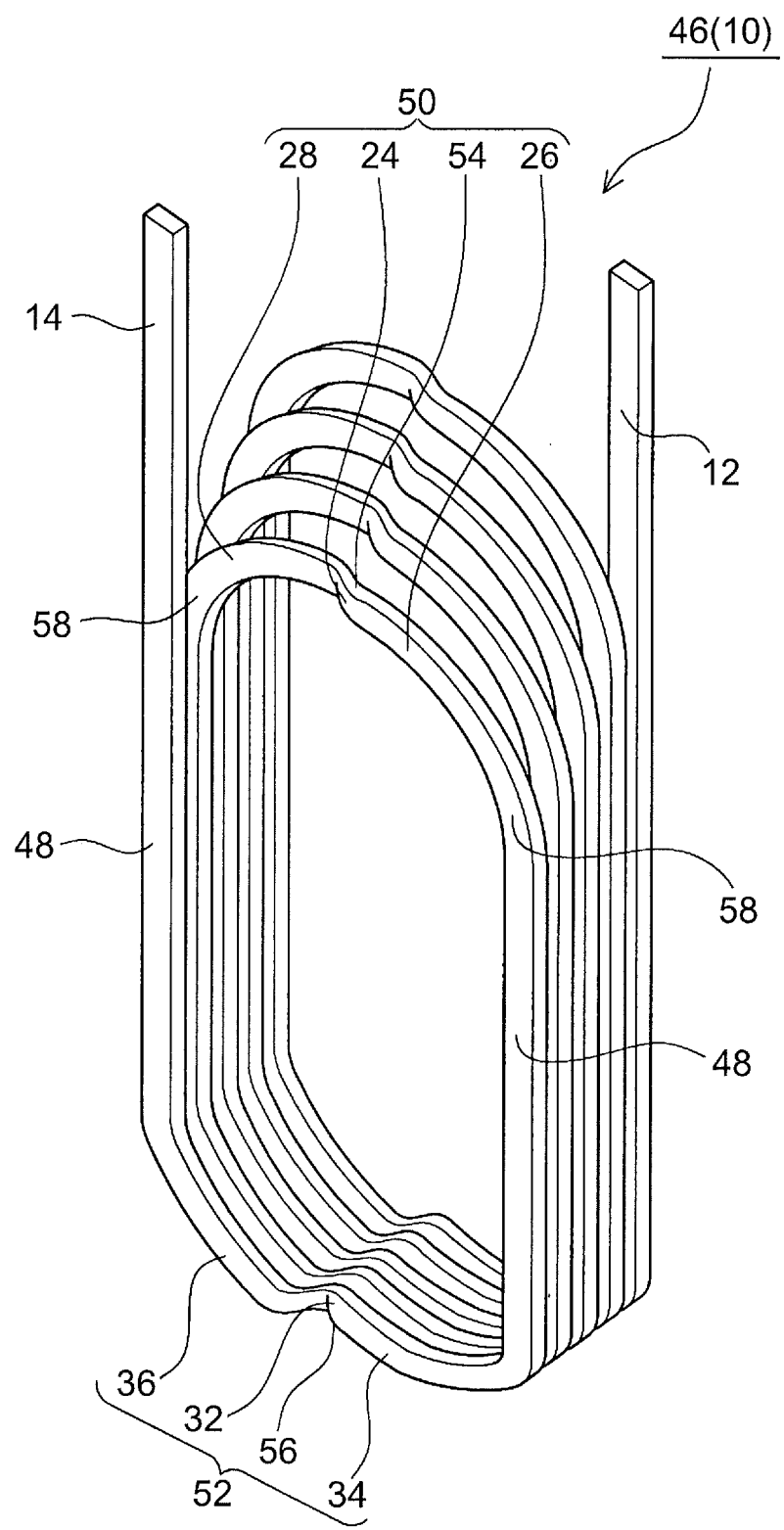
FIG. 38 is a perspective view showing the appearance of the winding after forming by the crank forming step in a modification.
Figure 39:
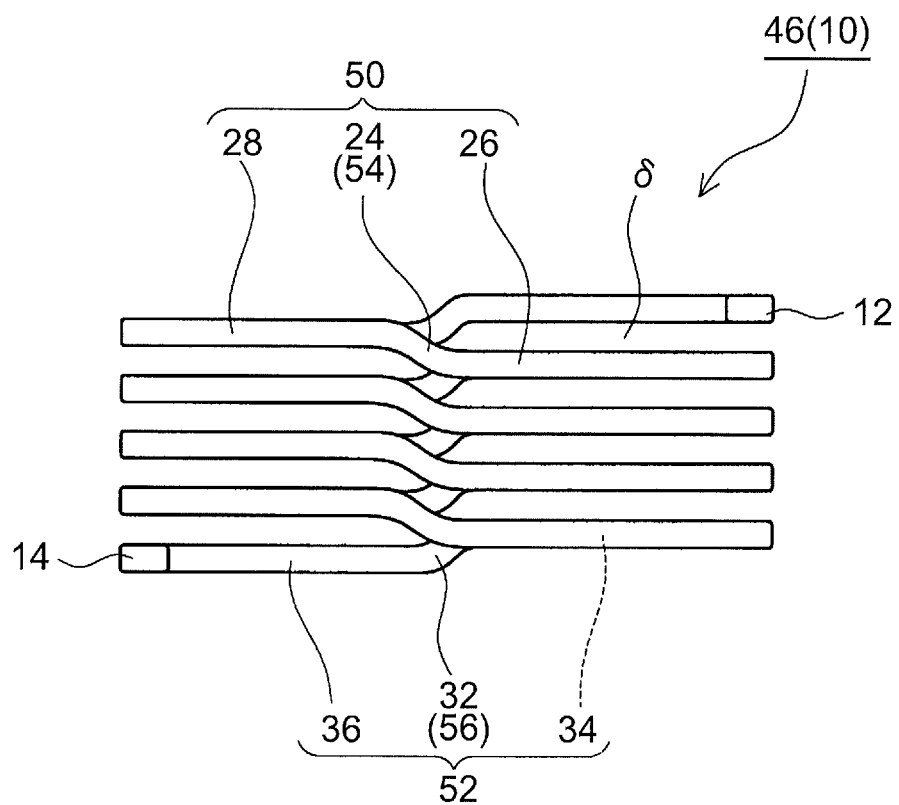
FIG. 39 is a top view of the winding after forming by the crank forming step in the modification.

In this modification, as shown in FIGS. 38 and 39, the winding 46 after forming by the crank forming step has a rounded rectangular shape (oval shape) except for the edges 12, 14. The expected lead-side coil end placement portion 50 has the lane change portion 24 substantially in the central portion thereof (the central portion or the vicinity thereof). The expected opposite-side coil end placement portion 52 has the lane change portion 32 substantially in the central portion thereof (the central portion or the vicinity thereof).

As another modification, the steps may be performed in order of the winding step, the 90° bending forming step, the crank forming step, the protrusion forming step, and the arc forming/opening step, or in order of the winding step, the 90° bending forming step, the protrusion forming step, the crank forming step, and the arc forming/opening step. As still another modification, the steps may be performed in order of the winding step, the 90° bending forming step, the arc forming/opening step, the crank forming step, and the protrusion forming step, or in order of the winding step, the 90° bending forming step, the arc forming/opening step, the protrusion forming step, and the crank forming step.

As yet another modification, the opening step and the arc forming step may be performed separately. For example, the steps may be performed in order of the winding step, the protrusion forming step, the crank forming step, the arc forming step, the 90° bending forming step, and the opening step. As a further modification, the crank forming step and the protrusion forming step may be performed simultaneously.

Figure 46:
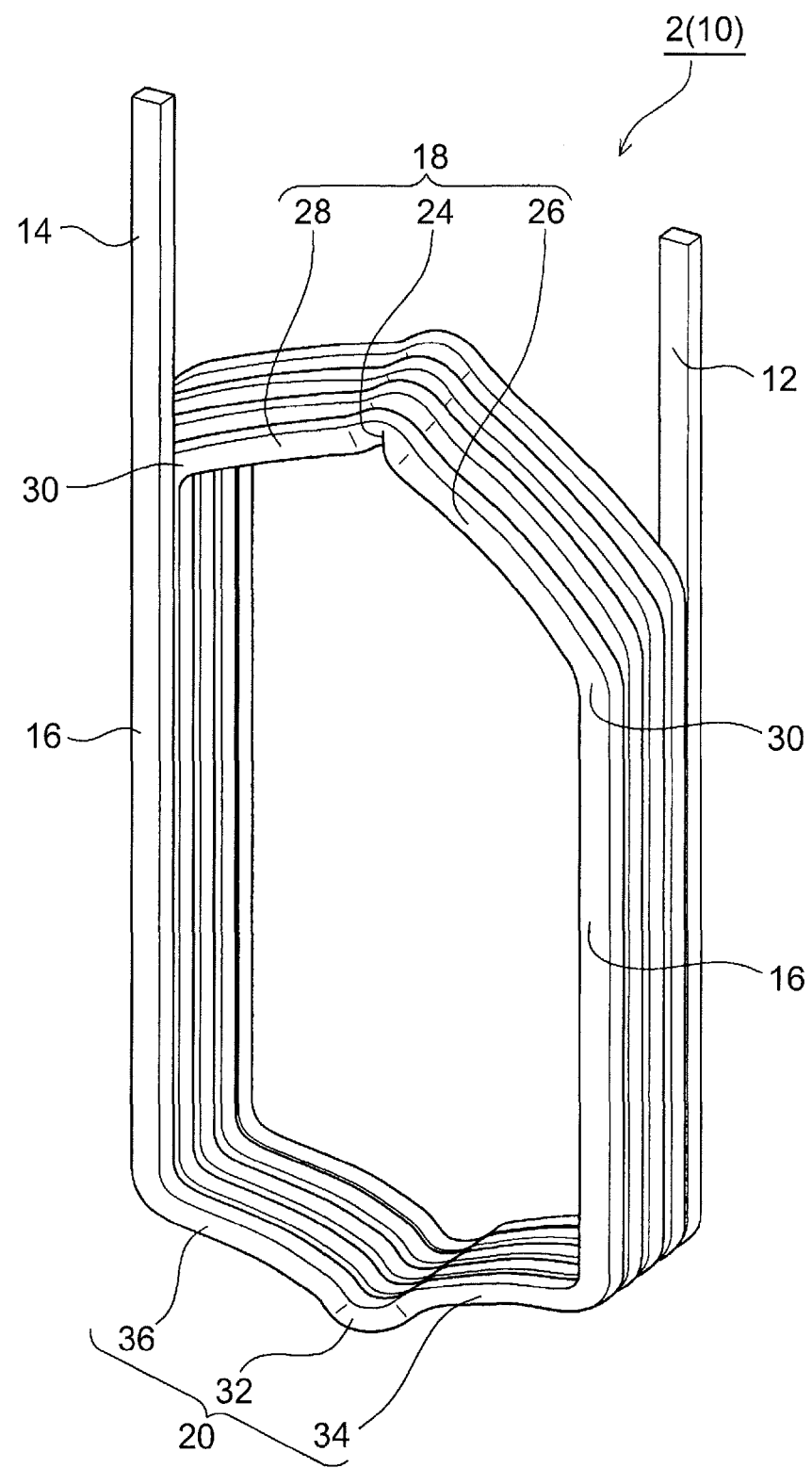
FIG. 46 is a perspective view showing the appearance of a coil having no bent portion.
Figure 47:
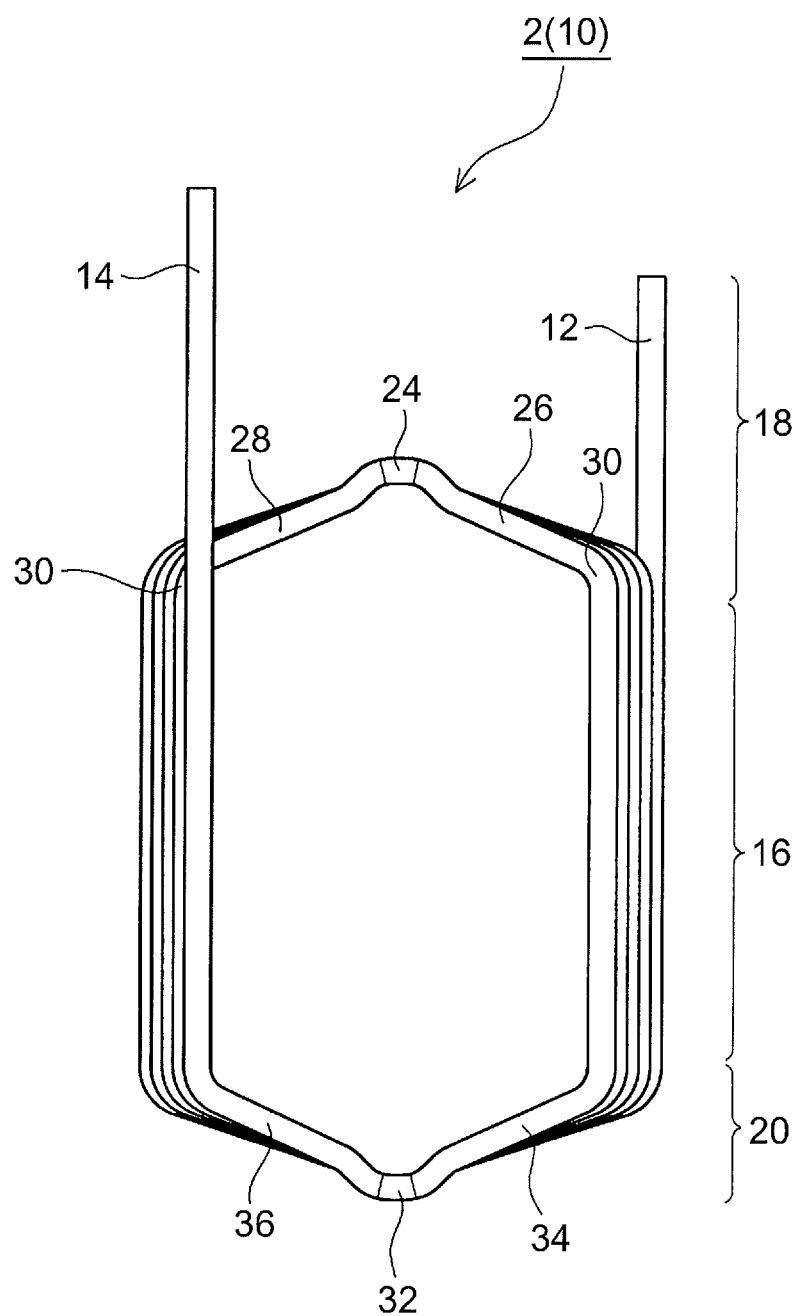
FIG. 47 is a front view of the coil having no bent portion.
Figure 48:
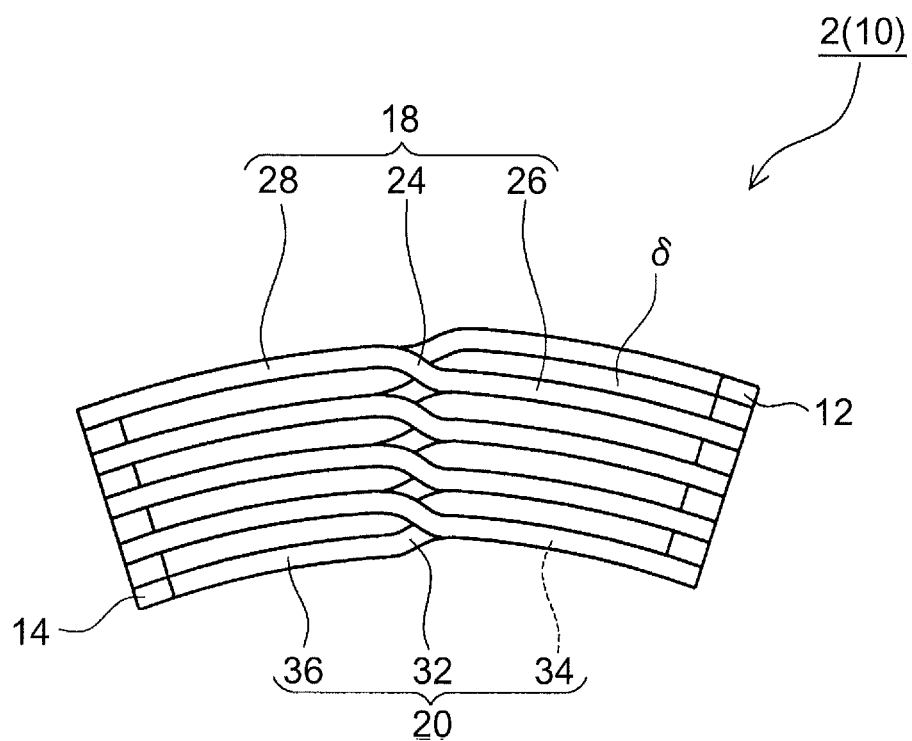
FIG. 48 is a top view of the coil having no bent portion.

As a still further modification, the 90° bending forming step may not be performed. A coil 2 manufactured by this modification in which the 90° bending forming step is not performed is different from the coil 1 in that the coil 2 does not have the bent portions 22 and the first and second edges 34, 36 of the opposite-side coil end placement portions 20 are also formed into an arc shape, as shown in FIGS. 46 to 48. FIG. 46 is a perspective view showing the appearance of the coil 2, FIG. 47 is a front view of the coil 2, and FIG. 48 is a top view of the coil 2.

It should be understood that the above embodiment is shown by way of illustration only, and is not intended to limit the present invention in any respect. Various improvements and modifications can be made without departing from the spirit and scope of the present invention.

DESCRIPTION OF THE REFERENCE NUMERALS

1 Coil
2 Coil
10 Rectangular Conductor
16 Slot Placement Portion
18 Lead-Side Coil End Placement Portion
20 Opposite-Side Coil End Placement Portion
22 Bent Portion
24 Lane Change Portion
26 First Edge
28 Second Edge
30 Round Portion
32 Lane Change Portion
34 First Edge
36 Second Edge
46 Winding
48 Expected Slot Placement Portion
50 Expected Lead-Side Coil End Placement Portion
52 Expected Opposite-Side Coil End Placement Portion
54 Top Part (of Expected Lead-Side Coil End Placement Portion)
56 Top Part (of Expected Opposite-Side Coil End Placement Portion)
58 Expected Round Portion
80 Protruding Portion (of Expected Lead-Side Coil End Placement Portion)
82 Protruding Portion (of Expected Opposite-Side Coil End Placement Portion)
130 Stator
132 Stator Core
134 Coil Basket
136 Slot
138 Bridge Portion
140 Lead Portion
142 Bridge Portion
144 Joint Portion
δ Clearance

The invention claimed is:

1. A method for manufacturing a coil that is formed by winding a conductor in a loop shape and stacking loops of the conductor and that includes a slot placement portion to be placed in a slot of a stator core, and a coil end placement portion to be placed outside the slot, comprising:
   a winding step of forming a winding having a pair of expected slot placement portions corresponding to the slot placement portion and a pair of expected coil end placement portions corresponding to the coil end placement portion by winding the conductor in the loop shape and stacking the loops of the conductor so that a clearance having a size corresponding to a width of the conductor is provided between adjoining loops of the conductor;
   a protrusion forming step of forming each of the pair of expected coil end placement portions into a protruding shape that protrudes in a radially outward direction of the winding;
   a crank forming step of forming, in each of the pair of expected coil end placement portions, a stepped portion having a size corresponding to the width of the conductor in a stacking direction of the loops of the conductor;
   an opening step of forming the winding so that an interval between the pair of expected slot placement portions gradually increases in the stacking direction of the loops of the conductor; and
   an arc forming step of forming, in one or both of the pair of expected coil end placement portions, an arc-shaped portion curved in the stacking direction of the loops of the conductor.

2. The method for manufacturing the coil according to claim 1, further comprising:
   a 90° bending forming step of bending and forming the winding formed in the winding step so that the stacking direction of the loops of the conductor in one of the pair of expected coil end placement portions becomes perpendicular to that of the loops of the conductor in the other expected coil end placement portion.

3. The method for manufacturing the coil according to claim 2, wherein
   the 90° bending forming step is performed before the opening step.

4. The method for manufacturing the coil according to claim 3, wherein
   the opening step and the arc forming step are performed simultaneously.

5. The method for manufacturing the coil according to claim 2, wherein
   the opening step and the arc forming step are performed simultaneously.

6. The method for manufacturing the coil according to claim 1, wherein
   the opening step and the arc forming step are performed simultaneously.

* * * * *